US012500055B2

(12) United States Patent
Lee

(10) Patent No.: US 12,500,055 B2
(45) Date of Patent: Dec. 16, 2025

(54) CIRCUIT BREAKER

(71) Applicant: LS ELECTRIC CO., LTD., Anyang-si (KR)

(72) Inventor: Moonsub Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 199 days.

(21) Appl. No.: 18/578,154

(22) PCT Filed: Nov. 25, 2021

(86) PCT No.: PCT/KR2021/017475
§ 371 (c)(1),
(2) Date: Jan. 10, 2024

(87) PCT Pub. No.: WO2023/286936
PCT Pub. Date: Jan. 19, 2023

(65) Prior Publication Data

US 2024/0331962 A1 Oct. 3, 2024

(30) Foreign Application Priority Data

Jul. 14, 2021 (KR) ........................ 10-2021-0092298

(51) Int. Cl.
*H01H 71/50* (2006.01)
*H01H 71/04* (2006.01)
(Continued)

(52) U.S. Cl.
CPC .......... *H01H 71/505* (2013.01); *H01H 71/04* (2013.01); *H01H 71/08* (2013.01); *H01H 71/521* (2013.01)

(58) Field of Classification Search
CPC .................................................... H01H 71/505
(Continued)

(56) References Cited

U.S. PATENT DOCUMENTS 7,964,809 B2 * 6/2011 Sapuram .............. H02B 11/133
200/50.21
11,189,994 B2 * 11/2021 Lee .......................... H02B 1/30
2010/0294629 A1 * 11/2010 Kim ..................... H01H 71/126
200/50.24

FOREIGN PATENT DOCUMENTS

EP 2254137 A1 * 11/2010 ........... H01H 33/666
JP H08293231 A 11/1996
(Continued)

OTHER PUBLICATIONS

International Search Report for related International Application No. PCT/KR2021/017475; action dated Jan. 19, 2023; (2 pages).
(Continued)

*Primary Examiner* — Alexander Talpalatski
(74) *Attorney, Agent, or Firm* — K&L Gates LLP

(57) ABSTRACT

The present disclosure relates to a circuit breaker having an energy releasing mechanism of an opening/closing mechanism part, and a circuit breaker according to an embodiment of the present invention comprises: an input latch locking device rotatably formed to restrict or release an input latch according to rotating angles thereof; an interlock movement rail which is installed on a cradle and in which an inspection position, a preparation position, and a driving position are configured; an interlock member for operating at least one among the input latch and a trip latch in a section excluding the inspection position, the preparation position, and the driving position while vertically moving in association with a relative movement of the interlock movement rail; and at least one link member connected between the interlock member and the input latch locking device and switching a linear movement in a vertical direction of the interlock member to a rotation movement, thereby rotating the input latch locking device.

16 Claims, 30 Drawing Sheets

(51) Int. Cl.
*H01H 71/08* (2006.01)
*H01H 71/52* (2006.01)

(58) Field of Classification Search
USPC ................................ 218/152–153; 200/50.21
See application file for complete search history.

(56) References Cited

FOREIGN PATENT DOCUMENTS

| | | | |
|---|---|---|---|
| KR | 100325408 | B1 | 3/2002 |
| KR | 200440691 | Y1 | 6/2008 |
| KR | 101087511 | B1 | 11/2011 |
| KR | 20180035079 | A | 4/2018 |
| KR | 102111463 | B1 | 5/2020 |

OTHER PUBLICATIONS

Written Opinion for related International Application No. PCT/KR2021/017475; action dated Jan. 19, 2023; (4 pages).
Notice of Allowance for related Korean Application No. 10-2021-0092298; action dated Oct. 23, 2023; (3 pages).
Office Action for related Korean Application No. 10-2021-00922298; action dated Apr. 20, 2023; (4 pages).

* cited by examiner (a)

(b)

(a)

(b)

(a)

(b)

(a)

(b)

(a)

(b)

(a)

(b)

(c)

(a)

(b)

CIRCUIT BREAKER

CROSS-REFERENCE TO RELATED APPLICATIONS

This application is the National Stage filing under 35 U.S.C. 371 of International Application No. PCT/KR2021/017475, filed on Nov. 25, 2021, which claims the benefit of earlier filing date of and rights of priority to Korean Application 10-2021-0092298, filed on Jul. 14, 2021, the contents of which are all hereby incorporated by reference herein in their entirety.

FIELD

Technical Field

The present disclosure relates to a circuit breaker provided with an energy release mechanism of a switching mechanism unit, and more particularly, to a circuit breaker provided with a release mechanism that automatically releases the energy of a closing spring of the switching mechanism unit when withdrawn.

Background

In general, a circuit breaker is an electrical device that is provided in a portion of an electrical system to automatically cut off a circuit in the event of an electrical overload or short circuit so as to protect the circuit and load.

The circuit breaker includes a terminal unit capable of being connected to a power source side or a load side, a contact portion including a stationary contactor and a movable contactor brought into contact with or separated from the stationary contactor to connect or disconnect a circuit, a switching mechanism that moves the movable contactor to provide power required for the switching of the circuit, a trip unit that senses an overcurrent or a short-circuit current from the power source side to induce a trip operation of the switching mechanism, and an arc extinguishing unit for extinguishing an arc generated when an abnormal current is interrupted, and the like.

Among those circuit breakers, a vacuum breaker is used as a circuit breaker provided in a high-voltage power system to cut off the circuit so as to protect the power system when a dangerous situation such as a short circuit or overcurrent occurs. The vacuum breaker is a product that cuts off a circuit to protect people and load equipment using a vacuum extinguishing method at a vacuum interrupter (VI) inside the breaker by a separate external relay when an abnormal current such as an overcurrent, a short circuit, and a ground fault occur in an extra high-voltage/high-voltage distribution line.

Such a high-voltage circuit breaker is provided with a switchboard that houses and manages various electrical devices, including circuit breakers, for operation and control of power plants and substations, operation of electric motors, or the like, and is generally used by being stored inside a cradle fixed to the switchboard.

Inside the cradle, there are provided a service position where a terminal of the circuit breaker is connected to a load terminal of the cradle to supply voltage and current, and a test position that is separated from terminals of the cradle to only test the operation of the circuit breaker.

The circuit breaker is provided with a closing spring and a trip spring to provide power that performs a closing operation or trip operation.

The circuit breaker is in a state where the energy of the closing spring is charged during operation. That is, the spring energy is charged to prepare for a situation where a fault current is cut off and then re-applied.

FIGS. 1 to 3 show a circuit breaker according to the related art. It is shown that a circuit breaker body 2 is inserted into a circuit breaker chamber 1. FIGS. 1 to 3 show a disconnected state, a test state, and an operation (service, connected) state, respectively.

The circuit breaker body 2 is moved to each position inside the circuit breaker chamber 1 while being placed on a cradle 3.

Meanwhile, the circuit breaker body 2 is provided with a mechanical mechanism 4 to perform operations related to the closing and opening of the contact portion.

Furthermore, FIGS. 4 to 6 show the state of the mechanical mechanism in each state (a disconnected state, a test state, an operation state). Additionally, FIG. 7 shows an internal structure of the circuit breaker.

The mechanical mechanism of a large-capacity circuit breaker includes a closing latch 13 for operating a closing spring, a trip latch 14 for operating a trip spring, a power shaft 5 that rotates with a driving force of a motor (not shown), a drive lever 6, a crank shaft 7, an operation lever 8, an interlock rod 9, a position interlock device 10 for preventing closing between insertion/withdrawal, a closing interlock device 11 that prevents a closing latch between insertion/withdrawal from being operated, and an interlock operation rail 12.

As shown in FIGS. 1 and 4, the closing spring is not loaded (charged) in an initial state (disconnected state) of the mechanism operation of the large-capacity circuit breaker. When the circuit breaker body 2 enters a test state as shown in FIGS. 2 and 5, the closing spring is loaded while rotating the crank shaft 7. At this time, the crank shaft 7 is caught at an end of the closing latch 13 and the circuit breaker is ready to be closed. As shown in FIG. 6, when the closing latch 13 is operated (released), the crank shaft 7 rotates and at the same time, the operation lever 8 also rotates to perform a closing operation.

In the state shown in FIG. 6, when the trip latch 14 is operated (the restraint is released), the mechanical mechanism returns again to an initial position shown in FIG. 4.

Meanwhile, in the related art, the position interlock device 10 operates in conjunction with the interlock operation rail 12 at a bottom of the circuit breaker as shown in FIG. 8 to allow the large-capacity circuit breaker to perform a closing/trip operation only at three specific positions (an inspection (disconnected) position, a ready (test) position, and an operation (connected) position).

As shown in FIG. 8, at each position (inspection (disconnected), ready (test), operation (connected)), the position interlock device 10 moves downward, causing the interlock rod 9 in conjunction with the position interlock device 10 to move downward, thereby moving also the closing interlock device 11 in conjunction with the interlock rod 9 downward to enable the operation of the closing latch 13.

If the position interlock device 10 moves upward along the interlock operation rail 12, then the operation of the closing latch 13 is restrained.

In such a manner, in the related art, when the circuit breaker is placed at each designated position in the circuit breaker chamber as shown in FIGS. 1 to 3, the closing spring is charged (recharged) to enable closing. Furthermore, during movement, closing is prevented by the closing interlock device 11.

However, since insertion/withdrawal is performed with the closing spring charged, the circuit breaker is withdrawn with the closing spring charged unless a user releases the charged energy by manually activating a closing button in the test state.

In this case, there is a risk of accidents due to maintenance work or operating errors.

Meanwhile, a conventional circuit breaker may be provided with a closing latch locking device that can lock or release the closing latch. In the conventional circuit breaker, the closing latch locking device may include a body portion disposed such that a portion thereof protrudes from the rear of a mounting plate of a circuit breaker body on which the mechanical mechanism is mounted, and disposed integrally with the protruding portion so that the protruding portion rotates together during rotation. The closing latch locking device body unit may be disposed to be in contact with the body of the closing latch provided on the front of the mounting plate so as to prevent the rotation of the closing latch.

Meanwhile, the body portion of the closing latch locking device may have one side on which a groove is disposed and the other side on which the groove is not disposed. Additionally, the other side on which the groove is not disposed may be disposed to be in contact with the closing latch body so as to prevent the rotation of the closing latch body. In this case, the closing latch may be restrained so as not to operate. On the contrary, in the case of one side on which the groove is disposed, a space in which the closing latch body can rotate may be provided so as to rotate the closing latch body. In this case, the closing latch may be released to operate.

In order to control the rotation of the closing latch locking device, the conventional circuit breaker is configured to push a protruding portion of the closing latch locking device that protrudes from the rear of the mounting plate through the mechanical mechanism to rotate the closing latch locking device.

FIG. 9A is a front view of a mechanical mechanism 90 in a circuit breaker according to the related art. Here, the mechanical mechanism 90 may be disposed on a rear side of the mounting plate of a conventional circuit breaker body.

Referring to FIG. 9A, the mechanical mechanism 90 may include an upper plate 97 and a lower rod 96. Here, the plate 97 and the interlock rod 96 may be coupled to each other to move integrally.

A sliding hole 93 may be disposed at a top of the plate 97 such that a mounting plate protrusion portion of the circuit breaker body can be slidably inserted thereinto. The plate 97 may move up and down by a sliding action between the mounting plate protrusion portion and the sliding hole 93.

A first lever 91 that is bent upward to come into contact with the closing latch so as to operate the closing latch, and a second lever 92 that comes into contact with the trip latch to operate the trip latch are disposed to protrude from one side of the plate 97. Here, an end portion of the second lever 92 may also be bent upward. Furthermore, the first lever 91 and the second lever 92 may come into contact with the closing latch or the trip latch, respectively, when the plate 97 moves upward.

Here, a distance between end portions (contact portions) of the first lever 91 and the second lever 92 is disposed to be smaller than that between the closing latch and the trip latch. Therefore, when the plate 97 moves upward, the second lever 92 first comes into contact with the trip latch, and then the first lever 91 comes into contact with the closing latch.

Meanwhile, a locking portion 95 coupled to the closing latch to restrain or release a closing protrusion portion that operates together, and a third lever 94 disposed to come into contact with a protruding portion (protruding portion) of the closing latch locking device to rotate the closing latch locking device protruding portion may be disposed on the other side of the plate 97. The third lever 94 may be disposed at an upper portion of the other side of the plate 97 and may be bent upward. In addition, an end side of the third lever 94 may push one side of the closing latch locking device protruding portion to rotate the closing latch locking device protruding portion, and the closing latch body may rotate according to the rotation of the closing latch locking device protruding portion to release the restraint of the closing latch.

Meanwhile, FIGS. 9B to 9D are diagrams showing operational states in which the closing latch is operated by a mechanical mechanism in a circuit breaker according to the related art.

First, referring to (a) of FIG. 9B, (a) of FIG. 9B shows an example of a state in which the rod 96 is placed at an inspection position, a ready position, or an operation position in the interlock operation rail 12 shown in FIG. 8. In this case, the plate 97 is in a state in which an upward movement is not performed, and as shown in (b) of FIG. 9B, the first lever 91 and the second lever 92 may be in a state in which the closing latch 34 and the trip latch 35 are not operated. Furthermore, the third lever 94 may be in a state in which the closing latch locking device protruding portion 80*a* is not rotated.

Meanwhile, referring to (a) of FIG. 9C, (a) of FIG. 9C shows an example in which the plate 97 rises as the rod 96 moves. When the plate 97 rises as described above, as shown in (b) of FIG. 9C, the second lever 92 may operate the trip latch 35, but the first lever 91 may be in a state of not being in contact with the closing latch 34. Therefore, the trip latch 35 may operate but the closing latch 34 may not operate. Additionally, as the plate 97 rises, the third lever 94 may push one side of the closing latch locking device protruding portion 80*a* to rotate the closing latch locking device protruding portion 80*a* by a predetermined angle.

Here, a rotation angle of the closing latch locking device protruding portion 80*a* may be limited depending on a height at which the plate 97 rises. Therefore, as shown in (b) of FIG. 9C, when the height at which the plate 97 rises is less than a predetermined height, a rotation angle of the closing latch locking device protruding portion 80*a* may also be limited, and as a result, a contact between the other side of the body portion of the closing latch locking device and the body of the closing latch 34 may be maintained to prevent the rotation of the body of the closing latch 34. Accordingly, a state in which the closing latch 34 is restrained may be maintained.

On the contrary, as shown in (a) and (b) of FIG. 9D, when the plate 97 rises higher, the first lever 91 and the second lever 92 may be in contact with the closing latch 34 and the trip latch 35, respectively. Therefore, not only the trip latch 35 but also the closing latch 34 may operate.

In this case, the third lever 94 may rotate the closing latch locking device protruding portion 80*a* beyond the predetermined angle as the plate 97 rises further. Then, as the protruding portion 80*a* rotates, the body of the closing latch 34 may reach one side of the closing latch locking device body portion on which the groove is disposed. Accordingly, the body of the closing latch 34 may be rotated to release the restraint of the closing latch 34 so as to operate the closing latch 34.

FIG. 9E is an exemplary diagram showing a case in which a malfunction of the closing latch locking device by the mechanical mechanism 90 occurs in the circuit breaker according to the related art.

As described above, in the case of the conventional circuit breaker, it has a structure in which as the mechanical mechanism 90, that is, the plate 97, rises, the third lever 94 pushes one side of the protruding portion 80*a* of the closing latch locking device to rotate the closing latch locking device protruding portion 80*a* so as to release the closing latch 34. Accordingly, the third lever 94 of the mechanical mechanism 90 must push up an outer portion that is away from a diametric center of the protruding portion 80*a* of the closing latch locking device. That is, as shown in (a) of FIG. 9E, the closing latch locking device protruding portion 80*a* may be properly rotated only when the mechanical mechanism 90 is pushed up to a position within a predetermined distance from an outer edge of the protruding portion 80*a* in a diametric center direction.

However, as shown in (a) of FIG. 9E, the closing latch locking device protruding portion 80*a* is small in size. Accordingly, as shown in (a) of FIG. 9E, an area of the protruding portion 80*a* that must be pushed up by the third lever 94 to rotate the protruding portion 80*a* is very narrow, corresponding to approximately 2 mm from an outer edge of the protruding portion 80*a*. Therefore, even if the plate 97 rises, when the third lever 94 does not reach an exact position of the closing latch locking device protruding portion 80*a*, one side of the closing latch locking device protruding portion 80*a* and the third lever 94 may not be correctly in contact with each other as shown in (b) of FIG. 9E. In this case, the closing latch locking device protruding portion 80*a* may not be rotated, and in this case, a locked state of the closing latch is maintained, and thus there is a problem in that malfunction may occur.

SUMMARY

The present disclosure is contrived to solve the above-mentioned problem, and an aspect of the present disclosure is to provide a circuit breaker provided with a release mechanism that automatically releases the energy of a closing spring of a switching mechanism unit when withdrawn.

In addition, another aspect of the present disclosure is to provide a circuit breaker having a structure that can prevent a malfunction of a closing latch locking device that restrains or releases a closing latch due to separation of the mechanism unit, or the like.

According to an embodiment of the present disclosure, there is provided a circuit breaker including a breaker body having a closing latch for a closing operation and a trip latch for a trip operation, and a cradle that carries the breaker body to perform an insertion and withdrawal operation within a breaker chamber, the circuit breaker including a closing latch locking device disposed to be rotatable so as to restrain or release the closing latch according to a rotation angle, an interlock operation rail provided on the cradle and set to an inspection position, a ready position, and an operation position, an interlock member that operates at least one of the closing latch and the trip latch in a section other than the inspection position, the ready position, and the operation position while moving vertically in conjunction with a relative movement of the interlock operation rail, and at least one link member disposed to connect between the interlock member and the closing latch locking device, and convert a vertical linear movement of the interlock member into a rotational movement so as to rotate the closing latch locking device.

Furthermore, the closing latch may be disposed to rotate a closing latch body around a closing latch rotation shaft during operation, and the closing latch locking device may be disposed to be rotatable, and provided with a body portion disposed to restrain a protrusion portion of the closing latch body so as to prevent the rotation of the closing latch body.

Furthermore, the body portion of the closing latch locking device may be provided with a groove disposed to be larger than a size of the protrusion portion on one side thereof, and disposed to rotate according to the rotation of the closing latch locking device so as to release, when the protrusion portion reaches one side of the body portion on which the groove is disposed, the restraint of the protrusion portion of the closing latch body by a space where the groove is disposed.

Furthermore, the closing latch locking device may be disposed integrally with the body portion, the closing latch locking device including a protruding portion protruding from a rear side of a mounting plate of the circuit breaker body on which the interlock member is disposed.

Furthermore, the at least one link member may include an operation link coupled to the protruding portion through a connection groove disposed into which the protruding portion is inserted, the operation link having a predetermined length and a connection link connecting between the operation link and the interlock member, the connection link having a predetermined length, wherein a first coupler and a second coupler, each comprising a rotation member, are connected between the interlock member and the connection link and between the connection link and the operation link therethrough and disposed to be rotatable.

Furthermore, at least one link member may be disposed, when the interlock member moves upward, to move the second coupler in an upward diagonal direction to an outside of the interlock member by the movement of the connection link according to the movement of the interlock member, and rotate the protruding portion while the connection link and the operation link are folded as the second coupler moves.

Furthermore, the interlock member may include a wide washer that guides the movement of the second coupler such that the connection link and the operation link are folded in an outward direction of the interlock member when the interlock member moves upward.

Furthermore, the wide washer may be disposed at a top of the interlock member, and coupled to a protruding portion of the circuit breaker body coupled to a sliding hole that guides a vertical movement of the interlock member.

Furthermore, the connection groove may further include a margin area along a direction in which the protruding portion is rotated, so as to absorb a rotational force due to the rise of the interlock member.

Furthermore, the protruding portion may protrude from the mounting plate in a semicircular pillar shape, and the connection groove may have a fan-shaped shape formed by an arc having a central angle greater than 180 degrees.

Furthermore, the interlock operation rail may include at least one convex portion such that rising heights of the interlock member between the inspection position and the ready position and between the ready position and the operation position are different when the interlock member moves along the interlock operation rail, and the at least one link member may rotate the closing latch locking device at different angles according to the different rising heights of the interlock member.

Furthermore, the interlock member may be disposed with a first lever in contact with the closing latch and a second lever in contact with the trip latch, which protrude from one side thereof, and when the interlock operation rail rises to a first height according to a height between the inspection position and the ready position, the closing latch may be operated by the rising first lever, and the trip latch may be operated by the rising second lever.

Furthermore, the closing latch locking device may rotate the closing latch locking device by a preset first angle when the interlock member rises by the first height, and when the closing latch locking device body portion rotates by the first angle, a protrusion portion of the closing latch body may reach one side where the groove of the closing latch locking device body portion is disposed to release the restraint of the closing latch body protrusion portion by the groove.

Furthermore, the interlock member may be disposed to operate only the trip latch by the second lever when the interlock member rises to a second height lower than the first height according to the height between the ready position and the operation position of the interlock operation rail.

Furthermore, the closing latch locking device may rotate the closing latch locking device by a second angle less than the first angle when the interlock member rises by the second height, and when the closing latch locking device body portion rotates by the second angle, the protrusion portion of the closing latch body may be restrained on the other side that is different from one side of the closing latch locking device body portion on which the groove is disposed to prevent the rotation of the closing latch body.

Furthermore, a gap between the closing latch and the first lever may be disposed to be greater than that between the trip latch and the second lever while no external force is applied.

According to a circuit breaker according to an embodiment of the present disclosure, when a breaker is withdrawn, a trip operation and a closing operation may be automatically performed at a non-operation position to release energy charged in a closing spring, thereby obtaining an advantage of not having to perform any work that manually releases the energy charged in the closing spring.

Accordingly, a situation in which a closing operation may be automatically performed without a user's knowledge when the circuit breaker is withdrawn and then re-inserted may be prevented, thereby having an effect of improving user safety.

According to a circuit breaker according to an embodiment of the present disclosure, a closing latch locking device protruding on a mounting plate may be connected to an interlock member through at least one link member, thereby preventing a malfunction of the closing latch locking device due to separation of a mechanism unit, or the like to increase the reliability of operation.

BRIEF DESCRIPTION OF THE DRAWINGS

FIGS. 13 and 14 are front and rear views in a state between a ready (test) position and an operation (service) position, and FIGS. 15 and 16 are front and rear views in a state between an inspection (disconnected) position and a ready (test) position.

DETAILED DESCRIPTION

Figure 1:
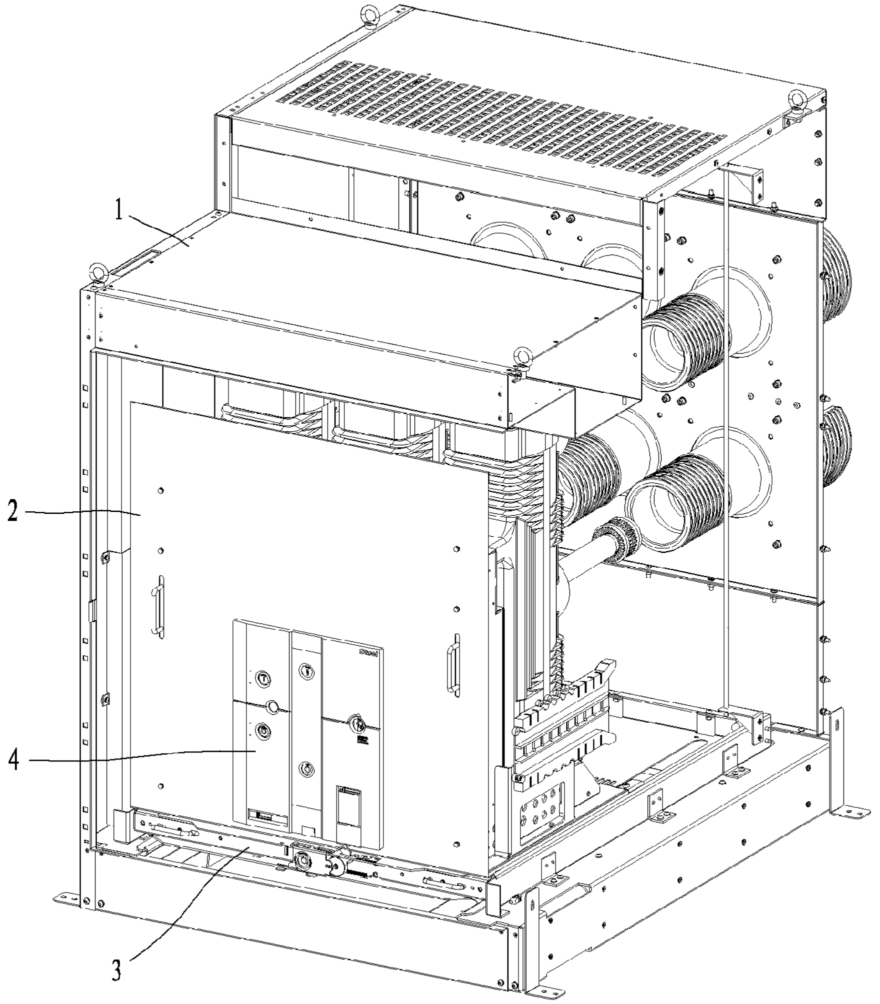
FIGS. 1 to 3 show states of a circuit breaker according to the related art. These are diagrams related to a disconnected state, a test state, and a connected state, respectively.
Figure 2:
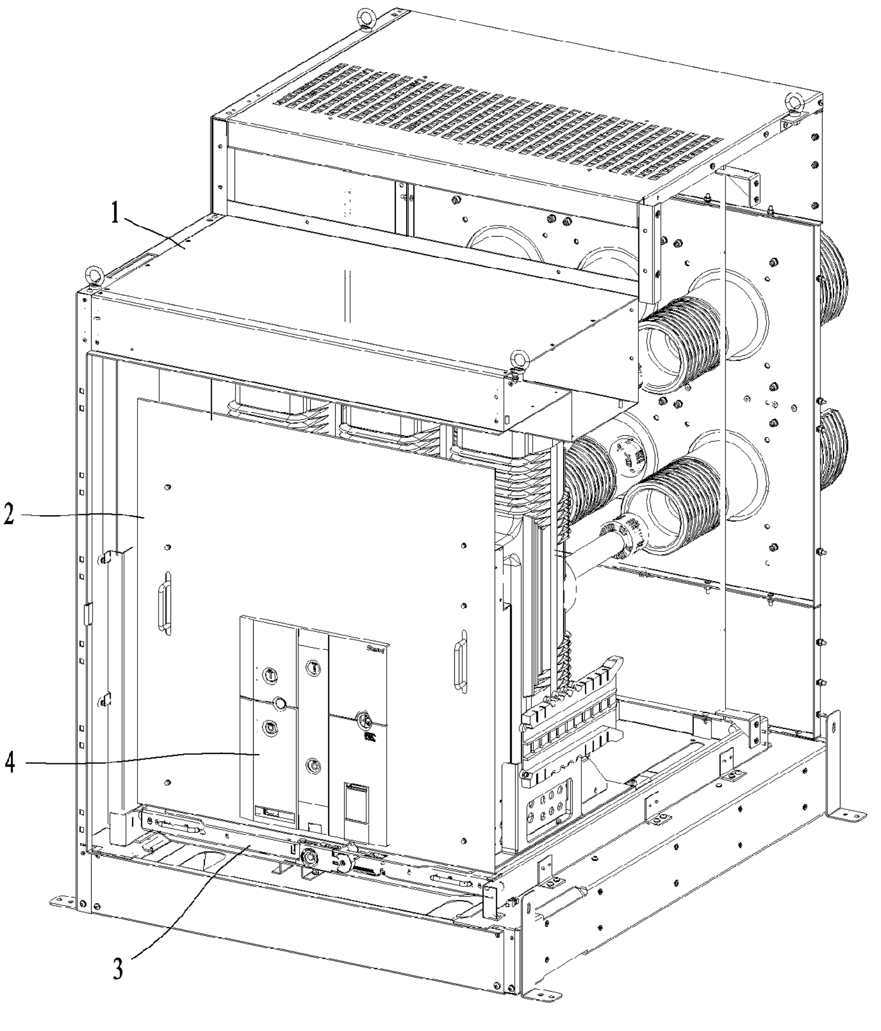
Figure 3:
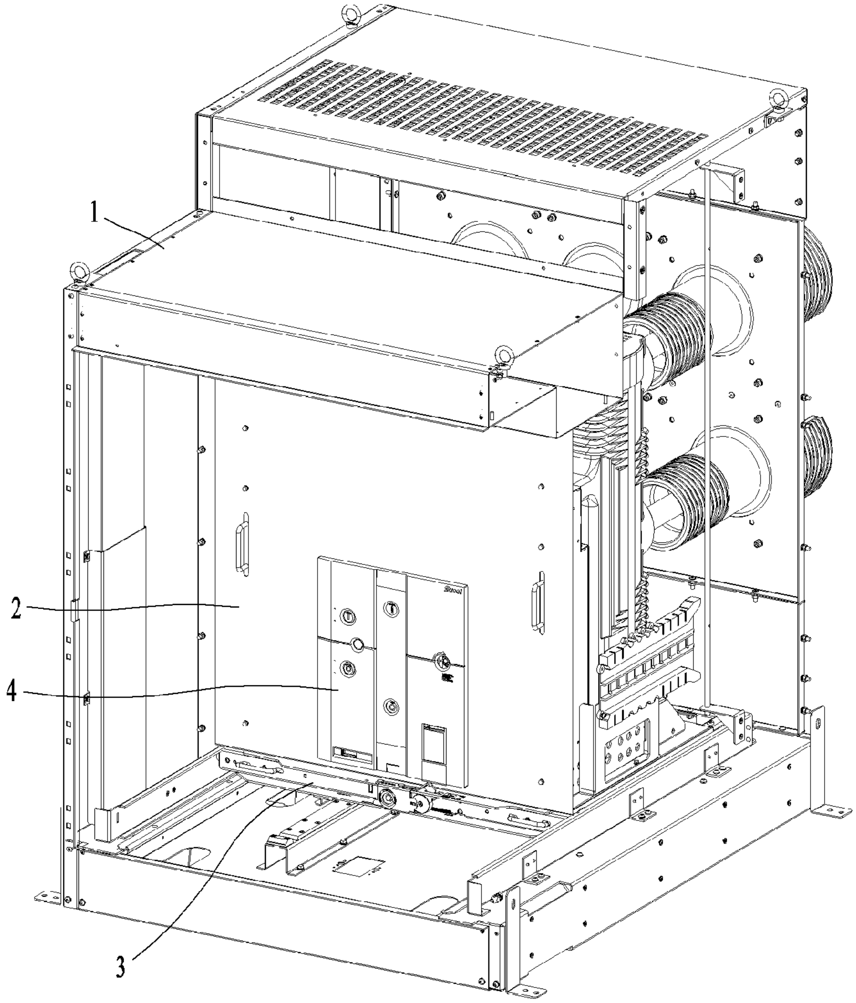
Figure 4:
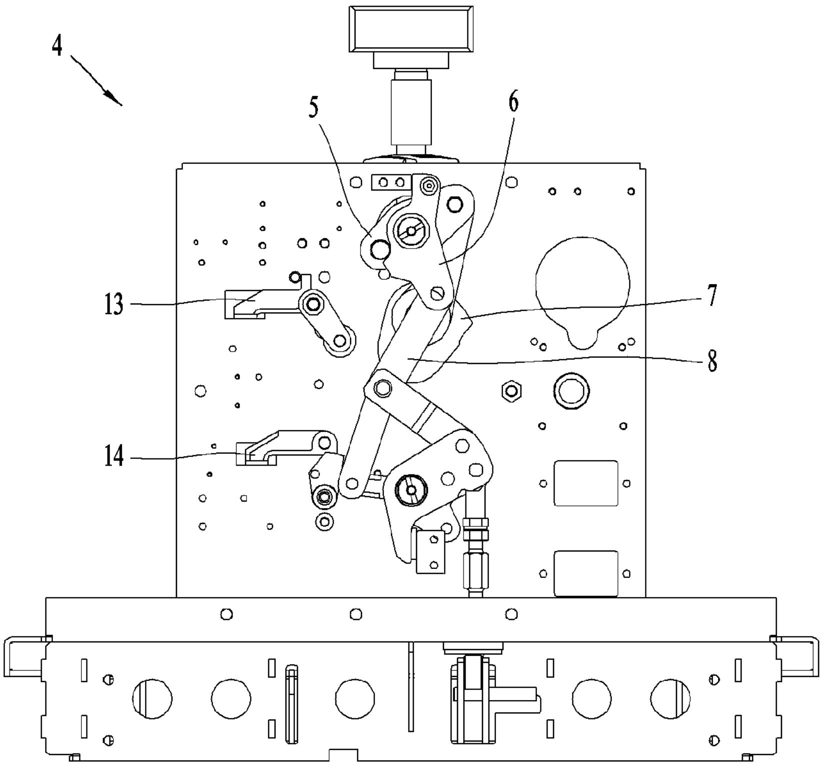
FIGS. 4 to 6 are state diagrams of a mechanical mechanism in a disconnected state, a test state, and a connected state, respectively.
Figure 5:
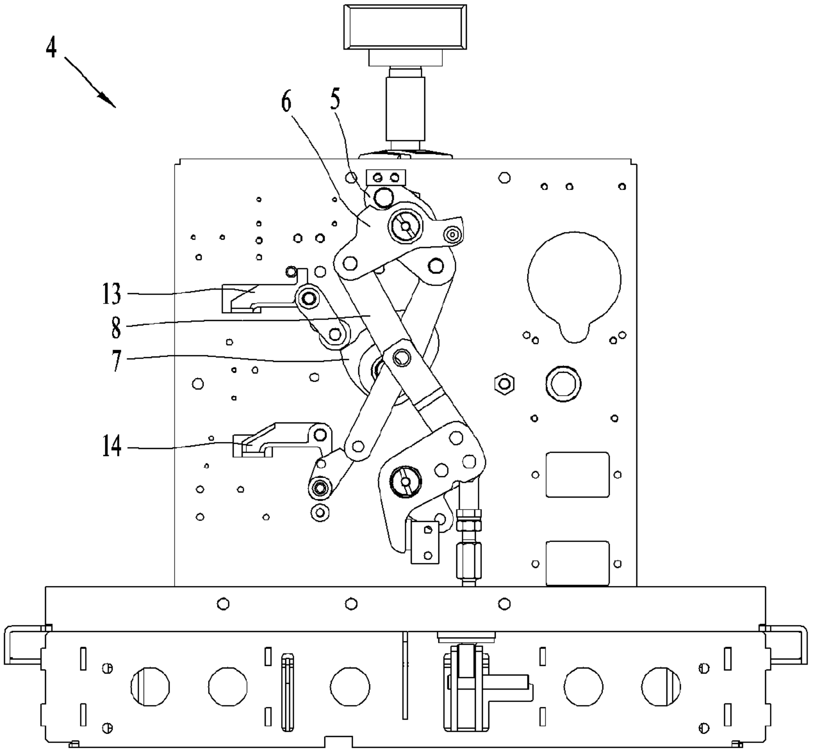
Figure 6:
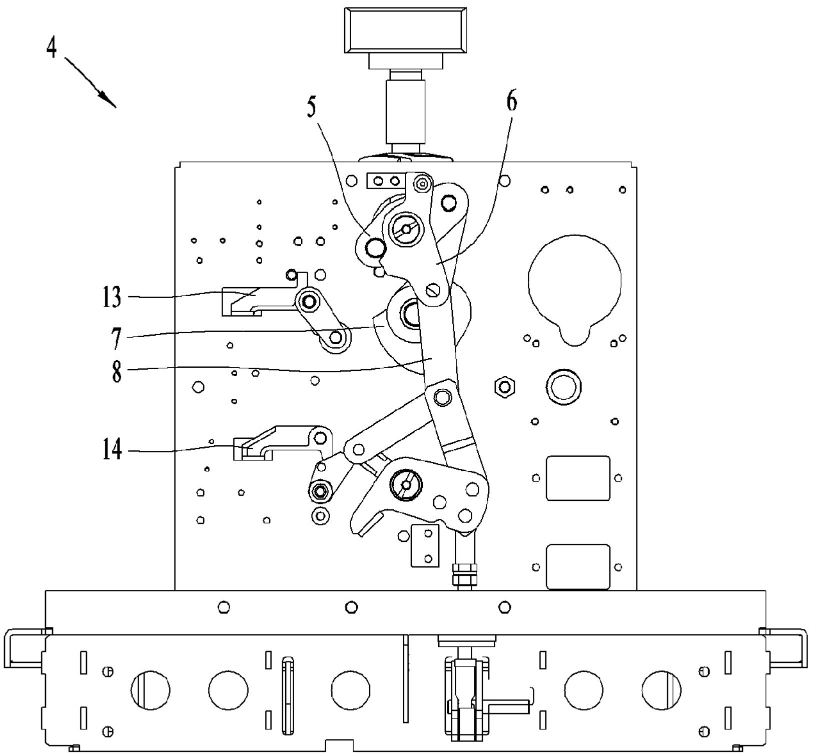
Figure 7:
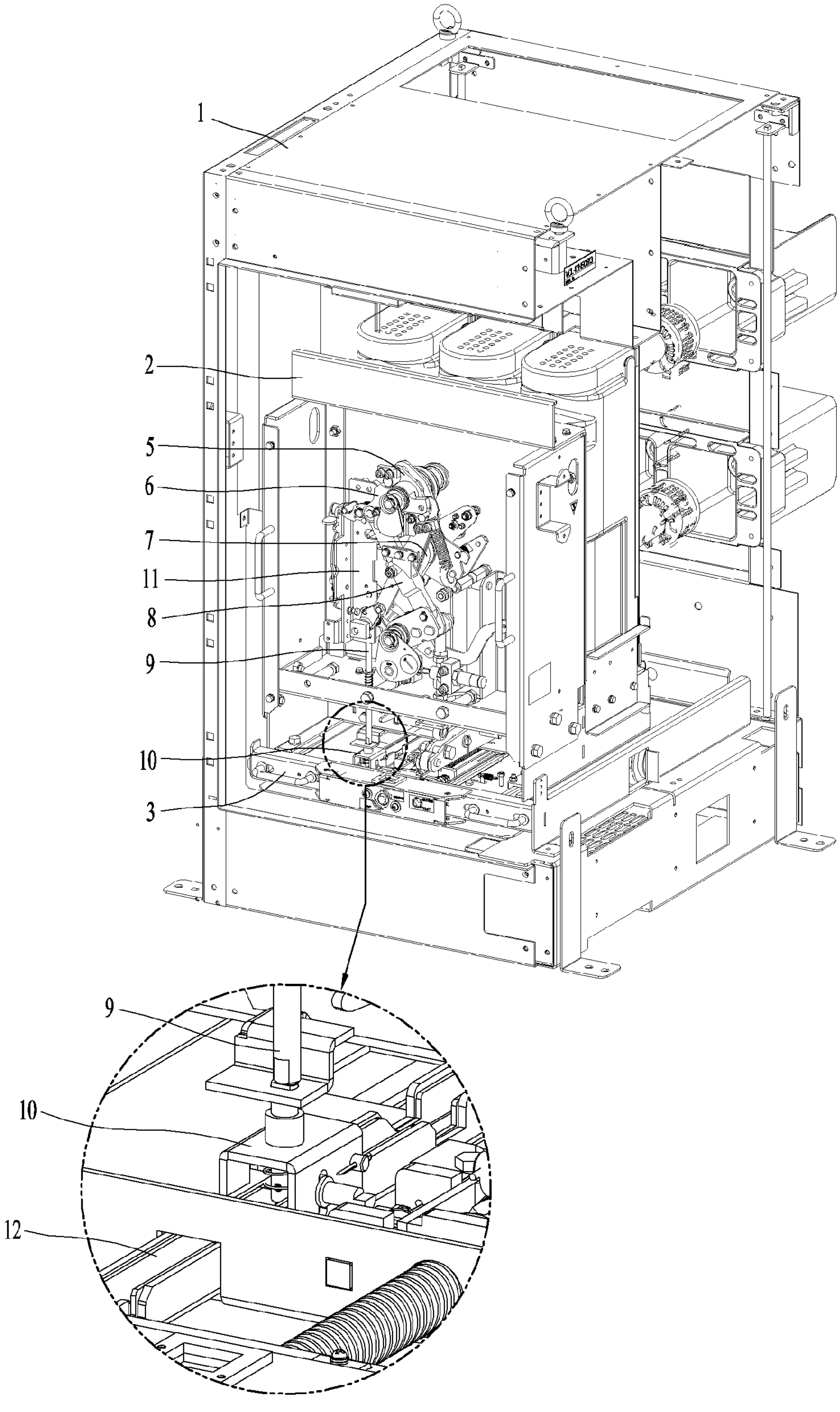
FIG. 7 is an internal perspective view of a circuit breaker according to the related art.
Figure 8:
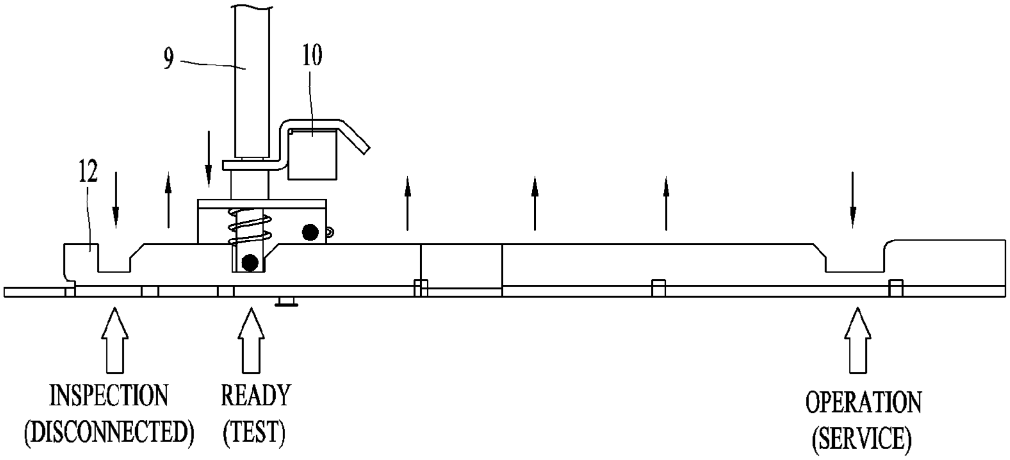
FIG. 8 is an operational state diagram of a position interlock device and an interlock rail in the circuit breaker according to the related art.
Figure 9A:
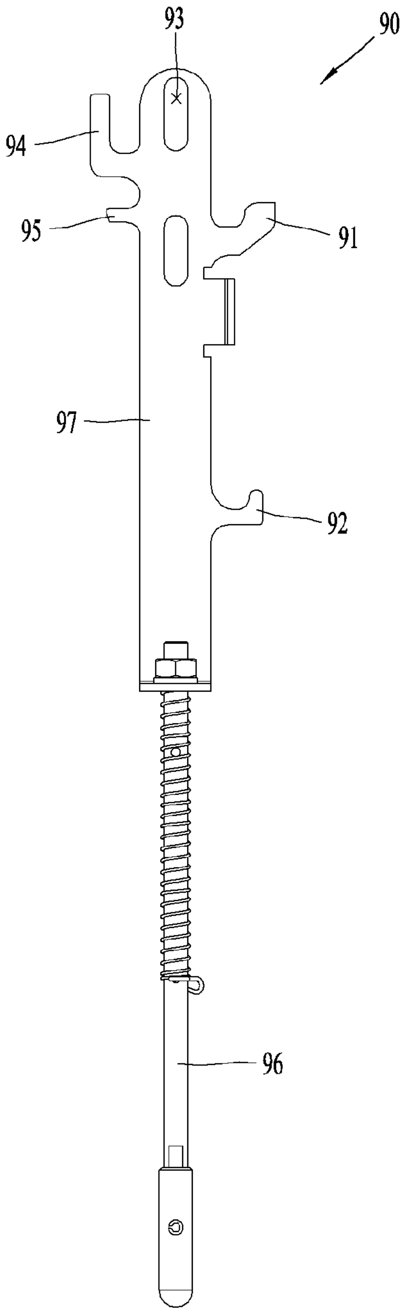
FIG. 9A is a front view of the mechanical mechanism in the circuit breaker according to the related art.
Figure 9B:
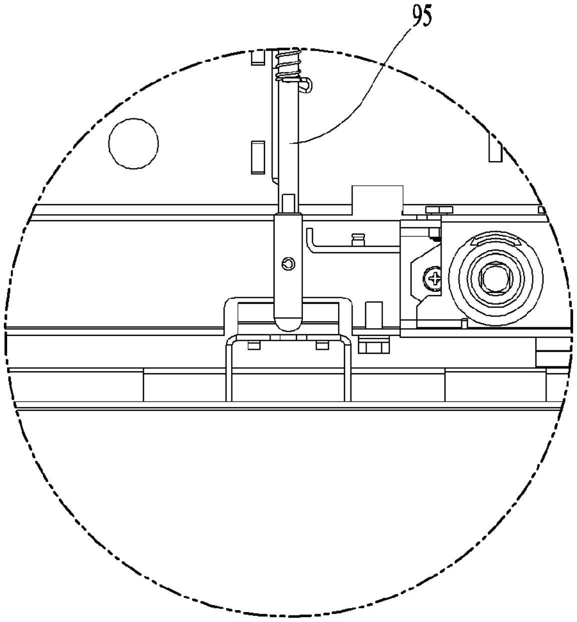
FIGS. 9B to 9D are diagrams showing operational states in which a closing latch is operated by the mechanical mechanism in the circuit breaker according to the related art.
Figure 9B:
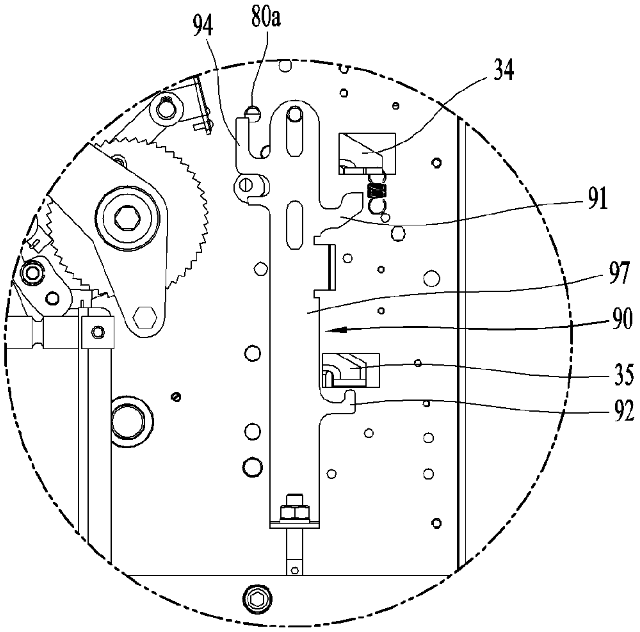
Figure 9C:
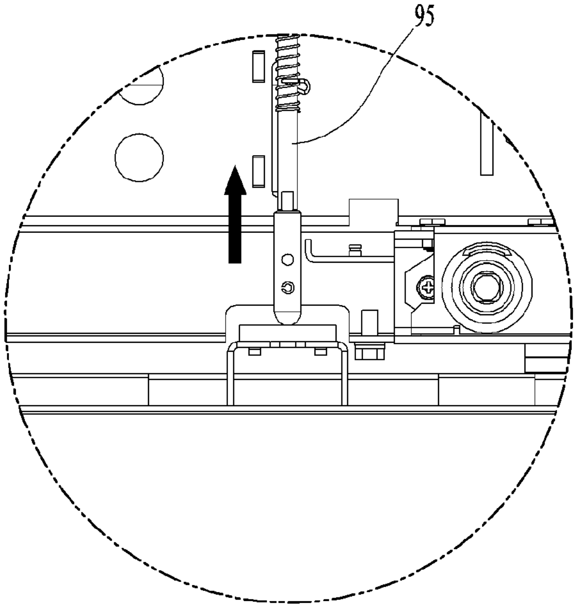
Figure 9C:
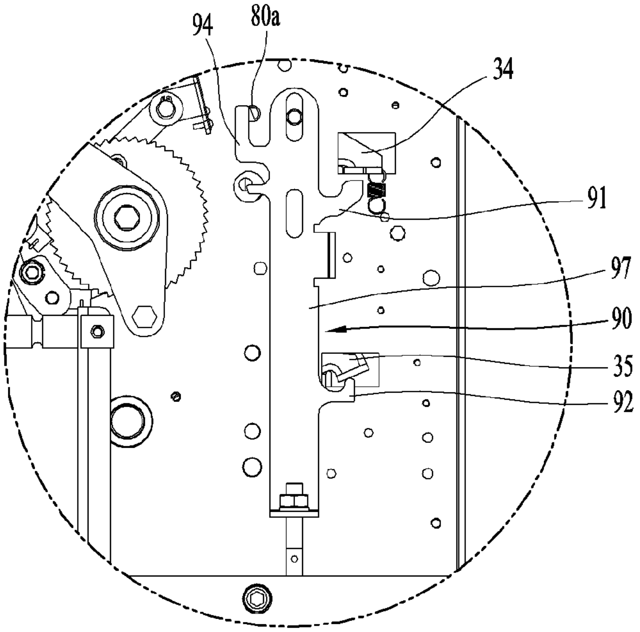
Figure 9D:
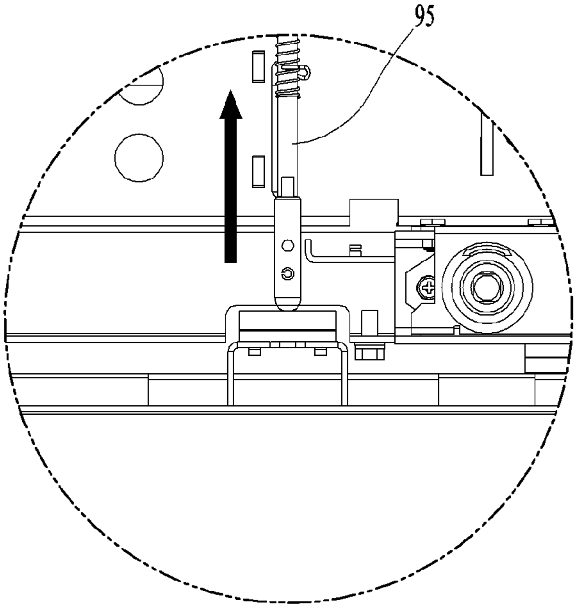
Figure 9D:
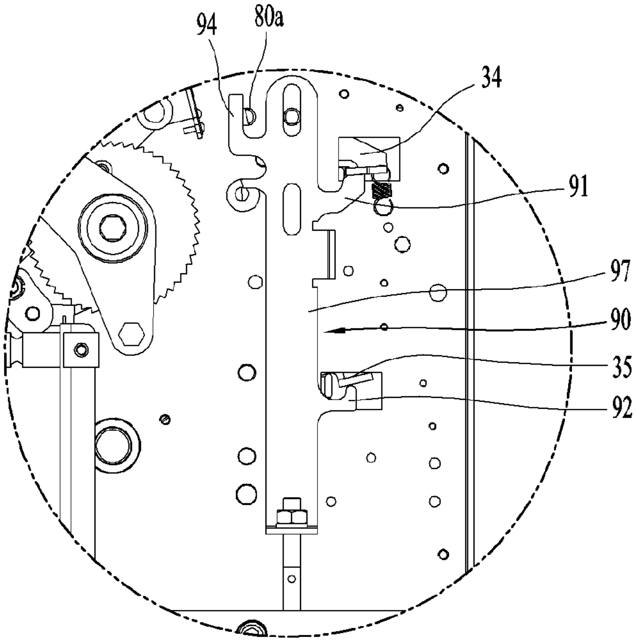
Figure 9E:
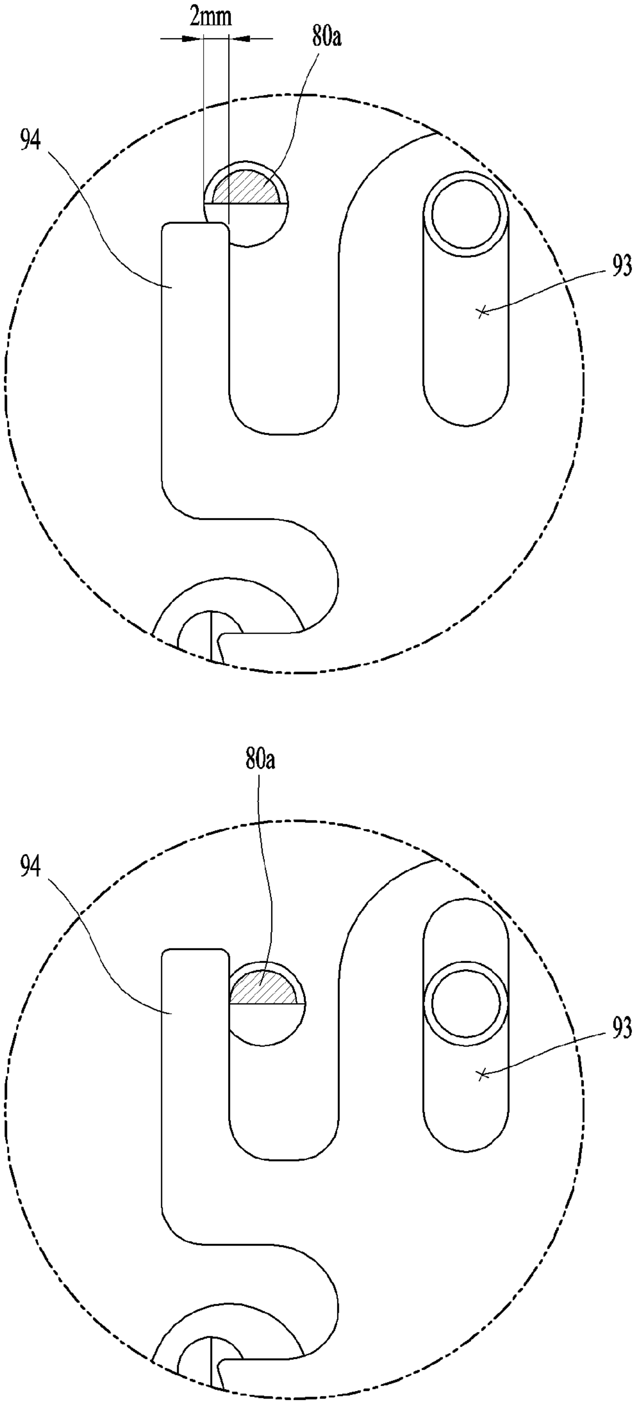
FIG. 9E is an exemplary diagram showing a case in which a malfunction of a closing latch locking device by the mechanical mechanism occurs in the circuit breaker according to the related art.

Hereinafter, preferred embodiments of the present disclosure will be described with reference to the accompanying drawings, which are intended to describe the present disclosure in detail to allow a person skilled in the art to easily carry out the invention, but not to mean that the technical concept and scope of the present disclosure are limited thereto.

A circuit breaker according to each embodiment of the present disclosure will be described in detail with reference to the drawings.

A circuit breaker according to an embodiment of the present disclosure, as a circuit breaker including a breaker body 25 having a closing latch 34 for a closing operation and a trip latch 35 for a trip operation, and a cradle 30 that carries the breaker body 25 to perform an insertion and withdrawal operation within a breaker chamber 20, includes an interlock operation rail 70 provided on the cradle 30 and set to an inspection position 71, a ready position 73, and an operation position 75, and an interlock member 40, 50 that operates the closing latch 34 and the trip latch 35 in a section other than the inspection position 71, the ready position 73, and the operation position 75 while moving vertically in conjunction with a relative movement of the interlock operation rail 70.

Figure 10:
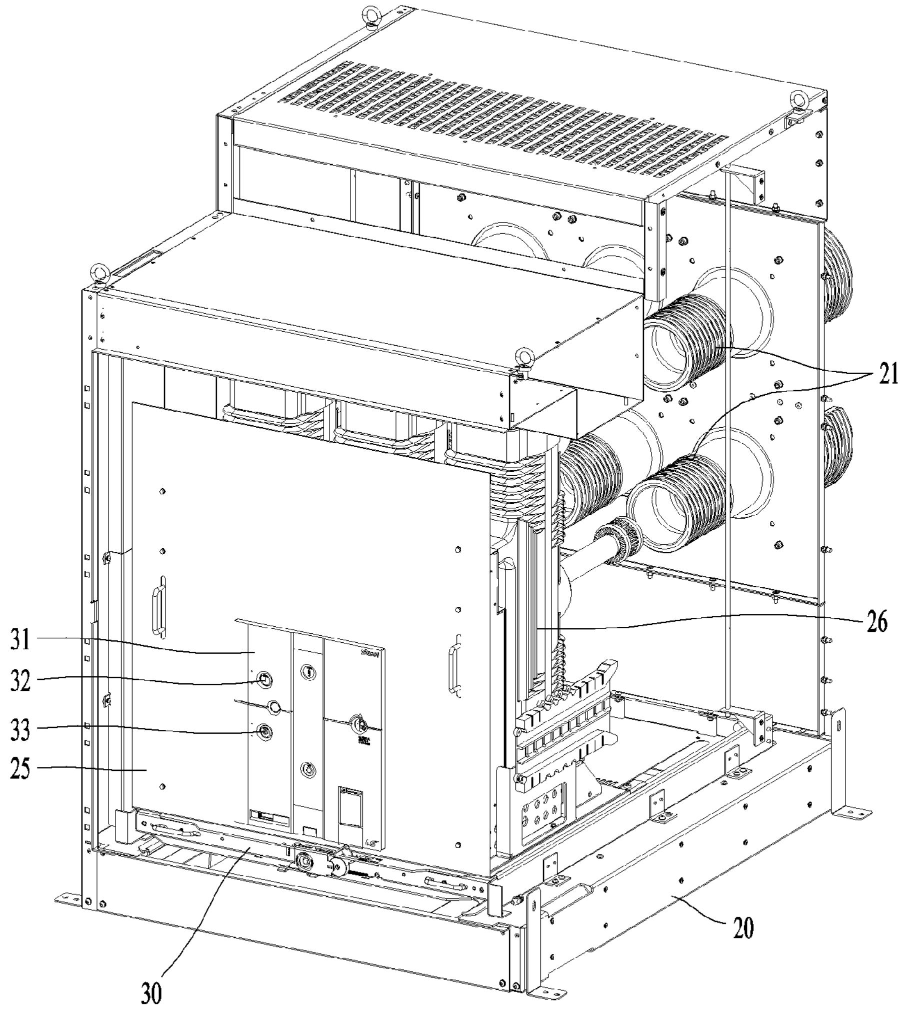
FIG. 10 is a perspective view of a circuit breaker according to an embodiment of the present disclosure.

FIG. 10 shows a circuit breaker according to one embodiment of the present disclosure.

The breaker chamber 20 is provided in a cabinet-like shape or a box-like shape. For the sake of understanding, a state is shown in which a front door and a side plate are removed. In the breaker chamber 20, a terminal bushing 21 is provided for each phase on a rear panel. The terminal bushing 21 may be provided as a pair of upper and lower terminal bushings for each phase. In this case, each terminal bushing is connected to a power source or load. That is, an upper terminal may be connected to a power source and a lower terminal may be connected to a load.

The breaker body 25 is carried on the cradle 30 to be inserted into or withdrawn from the breaker chamber 20. The breaker body 25 may be inserted into and withdrawn from the inspection position (disconnected state), the ready position (test state), and the operation position (connected state) by the cradle 30.

The breaker body 25 is provided with a breaking unit 26 connected to a main circuit for each phase to energize or cut off the circuit. Among circuit breakers, in the case of a breaker provided in a high-voltage power system, a vacuum breaker, or the like may be used as the breaking unit. The vacuum breaker cuts off a circuit to protect people and load equipment using a vacuum extinguishing method at a vacuum interrupter (VI) inside the breaking unit by a separate external relay that the abnormal current such as an overcurrent, a short circuit, and a ground fault occur in an extra high-voltage/high-voltage distribution line.

The breaking unit 26 is provided for each phase. The breaking unit 26 is provided with a fixed contact and a movable contact. The breaking unit 26 applied to a high-voltage circuit may be a vacuum interrupter.

The breaker body 25 is provided with a mechanical mechanism 31. The mechanical mechanism 31 provides power to close or open a circuit, and an on button 32 and an off button 33 are exposed to the outside. The user may operate the on button 32 and the off button 33 to close or open the breaker.

Figure 11:
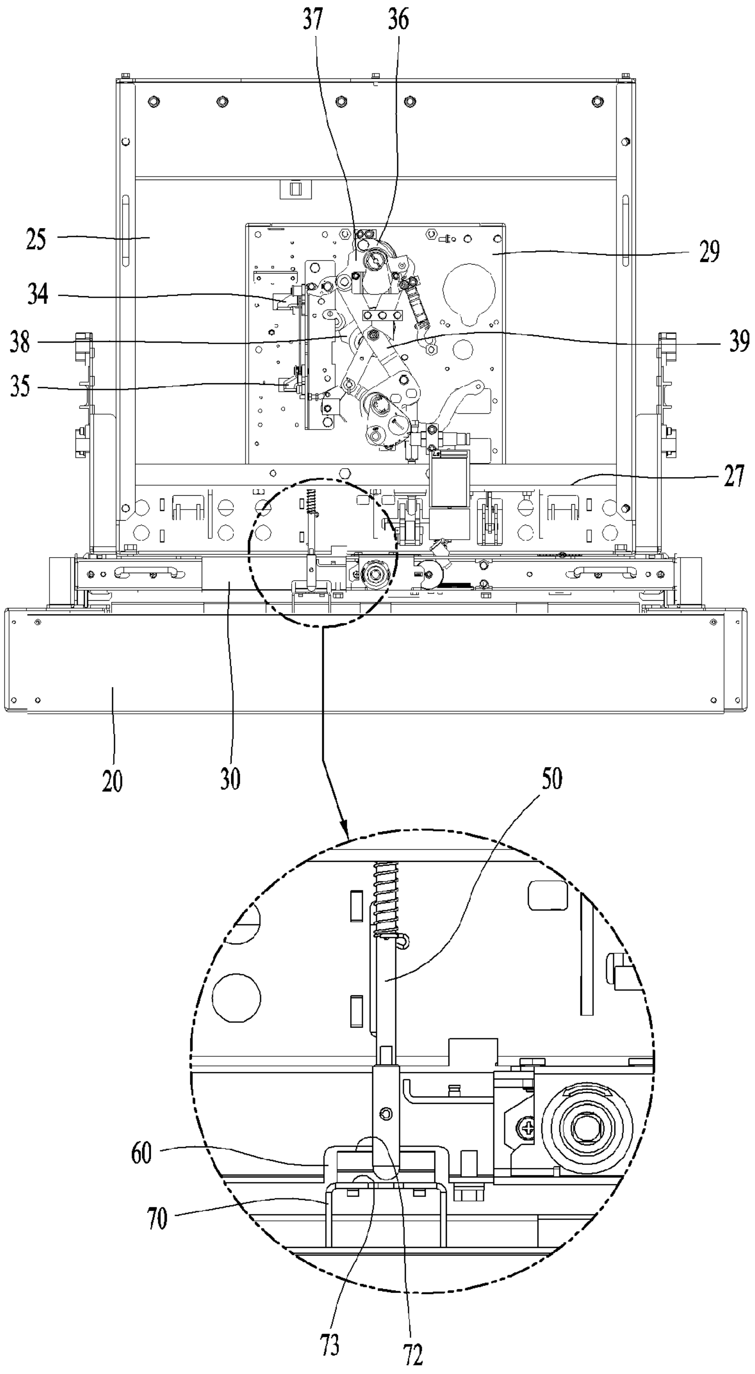
FIGS. 11 and 12 show front and rear views of a switching mechanism unit of the circuit breaker in FIG. 10. Here, the circuit breaker is in a ready (test) state.
Figure 12:
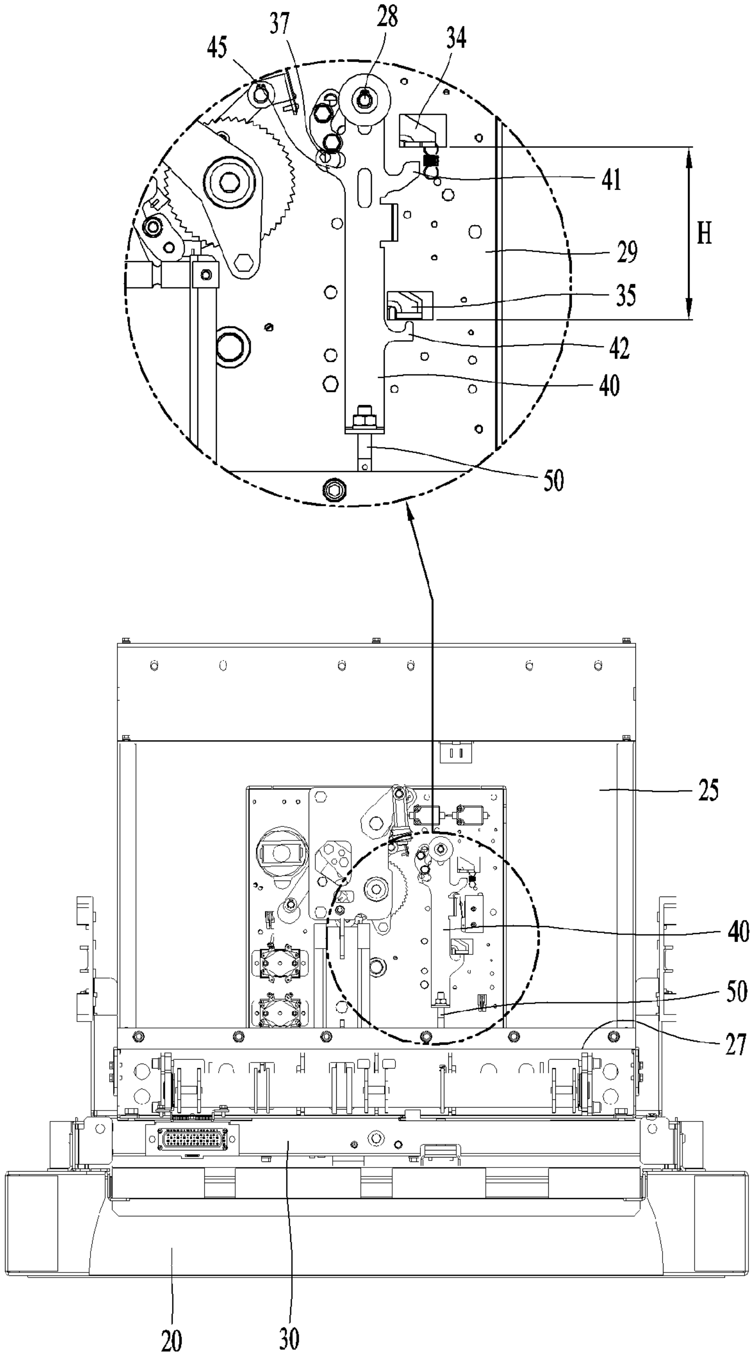

FIG. 11 shows a front view of the switching mechanism unit of the circuit breaker, and FIG. 12 shows a rear view of the switching mechanism unit of the circuit breaker. A state is shown in which an outer plate of the mechanical mechanism 31 is removed.

The mechanical mechanism 31 is provided with the closing latch 34 connected to the on button 32 and the trip latch 35 connected to the off button 33. Depending on the embodiment, the on button 32 and the closing latch 34 may be disposed integrally, and the off button 33 and the trip latch 35 may be disposed integrally.

In addition, a charging shaft 36 that provides power to the closing spring (not shown) is provided in the mechanical mechanism 31. A drive lever 37 is provided in conjunction with the charging shaft 36.

Meanwhile, a crank shaft 38 is provided to transmit a force for closing or tripping. An operating lever 39 is connected to the crank shaft 38.

Meanwhile, a rail groove 60 through which the interlock operation rail 70 can operate is disposed in the cradle 30. The interlock operation rail 70 moves in forward and backward directions through the rail groove 60 disposed in the cradle 30.

The interlock member 40, 50 is provided on a rear surface of the mounting plate 29 of the mechanical mechanism 31. The interlock member 40, 50 is provided with an interlock plate 40 at an upper side and an interlock rod 50 at a lower side.

The interlock plate 40 automatically operates a closing and trip function at the test position to release the energy loaded in the closing spring or trip spring.

Figure 18:
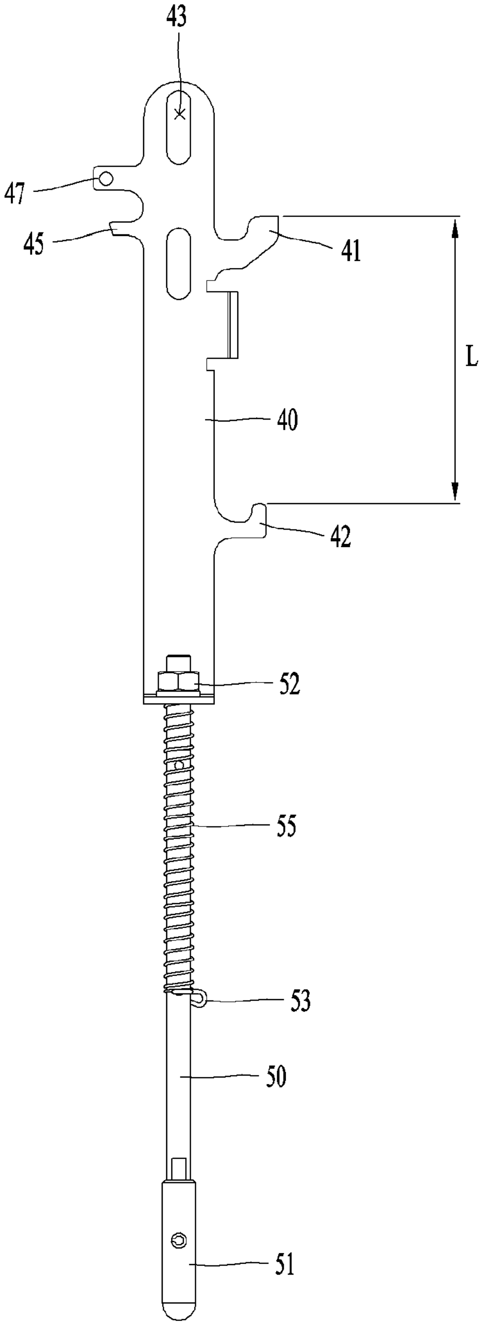
FIG. 18 is a front view of an interlock member applied to a circuit breaker according to the present disclosure.

Referring to FIG. 18, the interlock member 40, 50 may include an upper interlock plate 40 and a lower interlock rod 50. Here, the interlock plate 40 and the interlock rod 50 are coupled to each other by screw coupling 52 or the like to move as an integral body.

A sliding hole 43 is disposed at a top of the interlock plate 40 to allow the protrusion portion 28 of the mounting plate 29 to be slidably inserted therein. The interlock plate 40 may move up and down by a sliding action between the protrusion portion 28 and the sliding hole 43.

A first lever 41 that can operate the closing latch 34 in contact with the closing latch 34 is disposed in a protruding manner on one side of the interlock plate 40. An end portion of the first lever 41 may be bent upward.

A second lever 42 that can operate the trip latch 35 in contact with the trip latch 35 is disposed in a protruding manner on one side of the interlock plate 40. An end portion of the second lever 42 may be bent upward.

Here, the first lever 41 and the second lever 42 are disposed on one side of the interlock plate 40. That is, the first lever 41 and the second lever 42 are disposed to protrude in the same direction.

The first lever 41 and the second lever 42 may come into contact with the closing latch 34 or the trip latch 35, respectively, when the interlock plate 40 moves upward.

Here, a distance (L) between end portions (contact portions) the first lever 41 and the second lever 42 is disposed to be smaller than a distance (H) (see FIG. 12) between the closing latch 34 and the trip latch 35. In a normal state (a state in which no external force acts on each latch and the interlock member, that is, a state in which each latch does not operate and the interlock member is lowered), a gap between the closing latch 34 and the first lever 41 is greater than that between the trip latch 35 and the second lever 42. Accordingly, when the interlock plate 40 moves upward, the second lever 42 first comes into contact with the trip latch 35, and then the first lever 41 comes into contact with the closing latch 34.

Meanwhile, on the other side of the interlock plate 40, there are provided a locking portion 45 that is coupled to the closing latch 34 to restrain or release a closing protrusion portion 37 that operates together, and a connection portion 46 connected to at least one link member. The connection portion 46 may be provided with a coupling groove to be coupled to either one of the at least one link member through the coupling groove. Additionally, the link member may be connected to the protruding portion 80*a* of the closing latch locking device 80.

The link member may be disposed in plurality. As an example, the link member may include a connection link connected to the connection portion 46, and an operation link connected to the protruding portion 80*a* of the closing latch locking device 80. Furthermore, the connection link and the operation link may be connected through a coupler. Additionally, the connection portion 46 and the connection link may also be connected through a coupler. The coupler may include a rotation member to connect the two connected members around the rotation member so that the two members can rotate about the rotation member as an axis.

Hereinafter, an example of operation of the interlock member 40 and the closing latch locking device 80 connected through the at least one link member will be described in more detail with reference to FIGS. 20 to 22.

Meanwhile, the interlock rod 50 is coupled to a bottom of the interlock plate 40. The interlock rod 50 may include a rod-shaped body and a contact end portion 51 coupled to a bottom of the body. The contact end portion 51 comes into contact with the position interlock operation rail 70 to moves up and down depending on the position of the interlock operation rail 70. As the contact end portion 51 moves, the interlock member 40, 50 moves upward and downward.

The interlock rod 50 is provided with a return spring 55. When no upward force is received from the contact end portion 51, it returns to a downward position, and the return spring 55 causes the upward and downward movements to occur quickly along the interlock operation rail 70.

The return spring 55 has a fixed portion 53 at a lower end. The fixed portion 53 may be provided in a portion of the interlock rod 50.

An upper end of the return spring 55 may be provided on a lower plate 27 of the mechanical mechanism 31. The return spring 55 exerts compression and tension between the lower plate 27 and the fixed portion 53 as the interlock member 40, 50 moves upward and downward.

Figure 17:
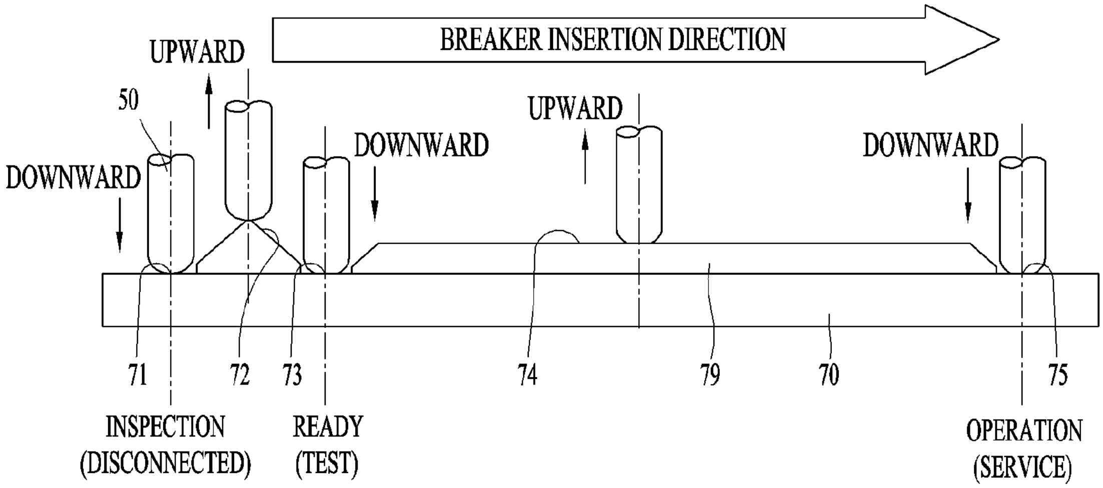
FIG. 17 is an operational state diagram of an interlock member and an interlock operation rail in a circuit breaker according to the present disclosure.

FIG. 17 will be referenced. The interlock operation rail 70 is provided. The interlock operation rail 70 may be fixedly provided at a bottom of the breaker chamber 20. Accordingly, as the cradle 30 moves, a position where the contact end portion 51 of the interlock member 40, 50 comes into contact with the interlock operation rail 70 may relatively change.

A height adjustment block portion 79 is disposed at a top of the interlock operation rail 70. The height adjustment block portion 79 has a step or polygonal block shape so that a height difference is formed in a front-to-rear direction.

Grooves are disposed in the height adjustment block portion 79 of the interlock operation rail 70 at the inspection position 71, the ready position 73, and the operation position 75 of the breaker body 25. The three positions may be disposed at the same height.

A first convex portion 72 is disposed between the inspection position 71 and the ready position 73 in the height adjustment block portion 79 of the interlock operation rail 70. The first convex portion 72 is disposed at the highest height in the height adjustment block portion 79. In the first convex portion 72, the contact end portion 51 of the interlock member 40, 50 rises to the maximum such that the first lever 41 operates the closing latch 34.

A second convex portion 74 is disposed between the ready position 73 and the operation position 75 in the height adjustment block portion 79 of the interlock operation rail 70. The second convex portion 74 is disposed at a height next to the first convex portion 72 in the height adjustment block portion 79. The height of the second convex portion 74 is higher than the height of the three positions, such as the inspection position 71, and is lower than the height of the first convex portion 72. In the second convex portion 74, the contact end portion 51 of the interlock member 40, 50 rises to a predetermined level such that the second lever 42 operates the trip latch 35. In the second convex portion 74, the first lever 41 is unable to operate the closing latch 34.

With reference to FIGS. 11 to 17, the operation of the interlock member 40, 50 and the interlock operation rail 70 in a circuit breaker according to an embodiment of the present disclosure will be described.

When the position of the breaker body 25 (and the cradle 30) is in the inspection (disconnected), ready (test), and operation (service) positions, respectively, the interlock member 40, 50 (specifically, a contact end portion of the interlock rod) is placed in the inspection position 71, the ready position 73, and the operation position 75, respectively.

In this position (state), since the interlock member 40, 50 is in a lowered state, the first lever 41 and the second lever 42 do not operate the closing latch 34 and the trip latch 35. Of course, at this time, the user can perform a closing or trip operation by a manual operation.

Figure 13:
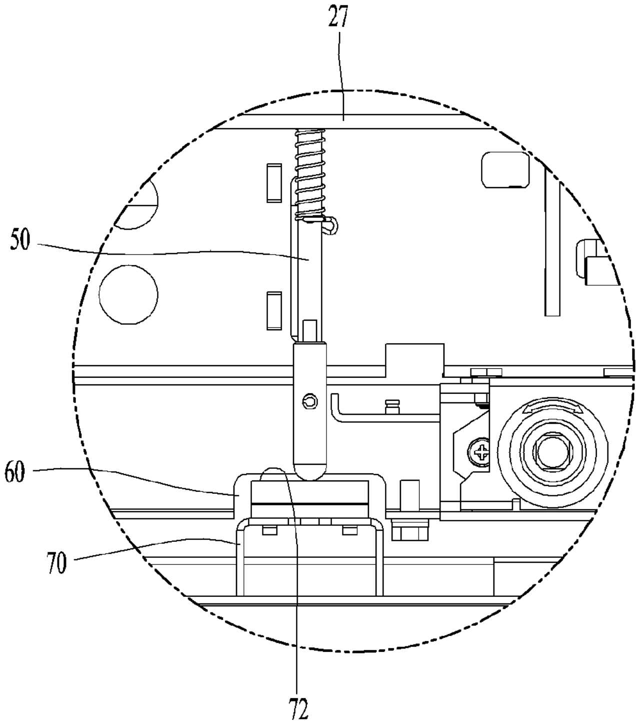
FIGS. 13 to 16 are operational state diagrams of a circuit breaker according to an embodiment of the present disclosure.
Figure 14:
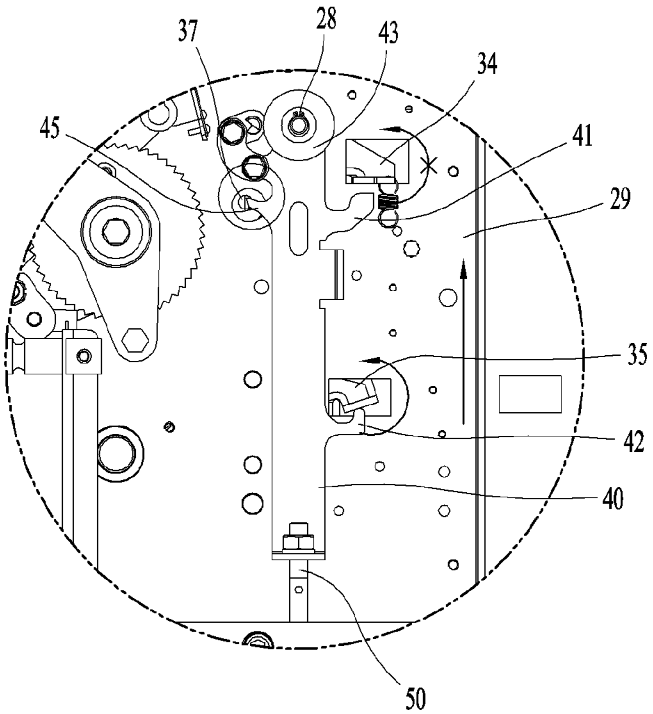

As shown in FIGS. 13 and 14, when the breaker body 25 moves through a section between the ready position 73 and the operation position 75, the interlock rod 50 is raised by the height adjustment block portion 79 and the interlock plate is raised, and the interlock plate 40 rises to a height of the second convex portion 74 to allow the second lever 42 to automatically operate the trip latch 35.

Accordingly, the circuit breaker that has been in a closed state is changed to an open state. Therefore, the user may safely withdraw the breaker body 25. Even though the user does not activate a trip operation, the trip operation is automatically performed while moving from the operation position 75 to the ready position 73, and the breaker body 25 is withdrawn in a safe state.

Meanwhile, when the breaker body 25 moves through a section between the ready position 73 and the operation position 75, the closing protrusion portion 37 is caught in the locking portion 45, and the closing latch 34 is unable to operate. That is, a closing prevention function is performed during movement.

Figure 15:
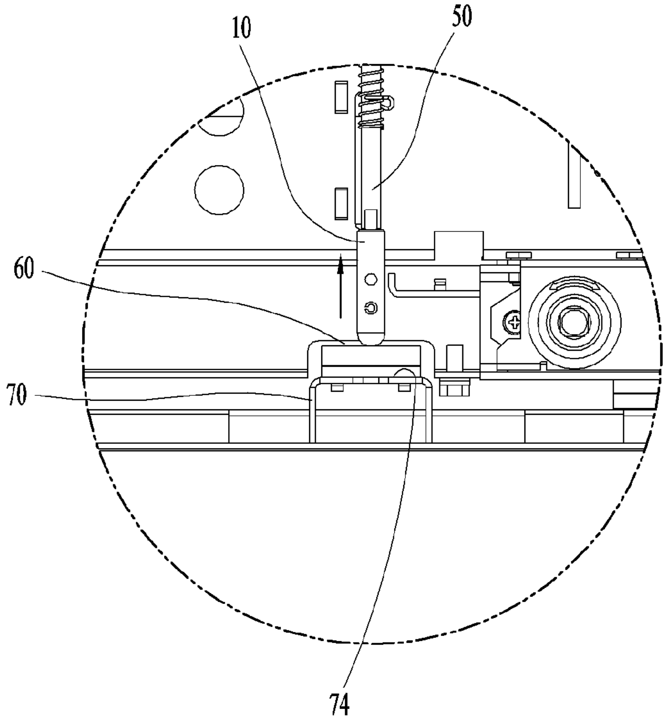
Figure 16:
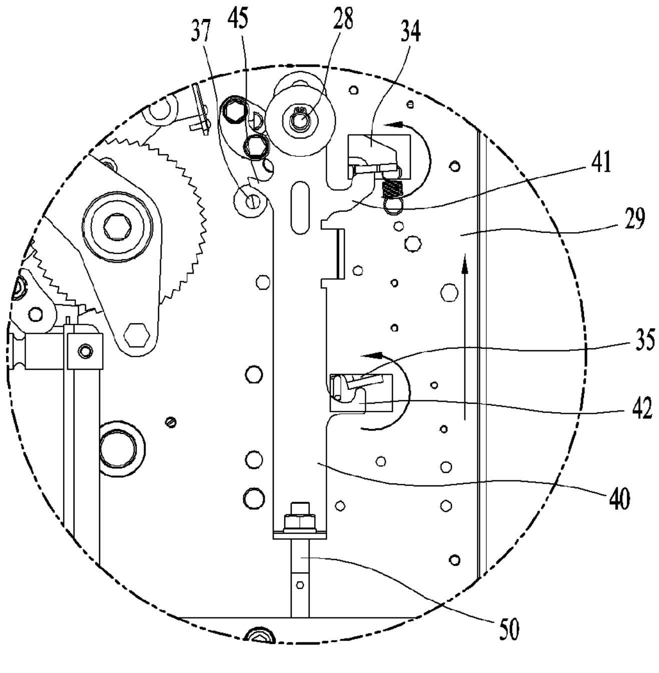

As shown in FIGS. 15 and 16, when the breaker body 25 moves through a section between the inspection position 71 and the ready position 73, the interlock rod 50 is raised by the height adjustment block portion 79 and the interlock plate is raised, and the interlock plate 40 rises to a height of the first convex portion 72 to allow the first lever 41 to automatically operate the closing latch 34.

As a result, energy that has been (re) charged in the closing spring is released to disable closing. Therefore, the user may safely withdraw the breaker body 25. Even though the user does not manually perform a closing operation at the ready position 73, the closing operation is automatically performed while moving from the ready position 73 to the inspection position 71, and the breaker body 25 is withdrawn in a safe state. Since the closing operation at this time is not performed at the operation position, the breaker contact portion is not closed, but only the closing spring is operated, and only a function of releasing the charging of the closing spring is performed. Of course, in this case, the trip latch 35 is also operated by the second lever 42, and a trip operation is also performed.

Accordingly, the breaker body 25 may be safely withdrawn while the energy of the closing spring is released.

In addition, a sound may be generated due to the action of the closing spring to allow the user to know a final state (open, spring discharged) of the circuit breaker, thereby allowing the user to perform a safe operation.

According to a circuit breaker according to an embodiment of the present disclosure, when a breaker is withdrawn, a trip operation and a closing operation may be automatically performed at a non-operation position to release energy charged in a closing spring, and thus it is not required to perform any work that manually releases the energy charged in the closing spring.

Accordingly, a situation in which a closing operation may be automatically performed without a user's knowledge when the circuit breaker is withdrawn and then re-inserted may be prevented, thereby improving user safety.

Meanwhile, the interlock plate 40 of the circuit breaker according to an embodiment of the present disclosure may be provided with the closing latch locking device 80 that can restrain or release the closing latch 34.

Figure 19:
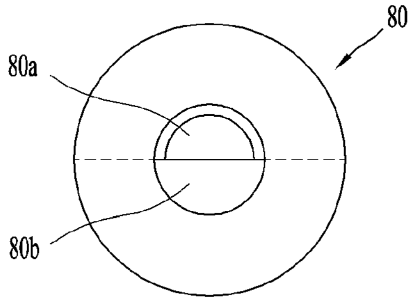
FIG. 19 is front and side views showing a closing latch locking device of a circuit breaker according to the present disclosure.
Figure 19:
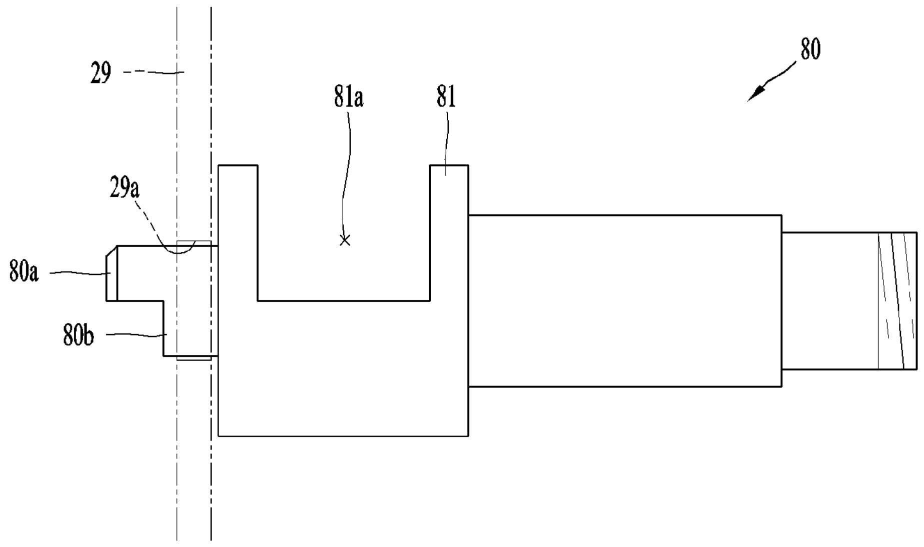

FIG. 19 is a front view and a side view showing the closing latch locking device 80.

Referring to FIG. 19, the closing latch locking device 80 may include a protruding portion 80*a* that protrudes from the rear of the mounting plate 29 through a through hole of the mounting plate 29, and a body portion 81 that is integrally disposed with the protruding portion 80*a*, and protrudes from the front of the mounting plate 29.

Here, the protruding portion 80*a* and the body portion 81 of the closing latch locking device 80 may be disposed to pass through the mounting plate 29 via the through hole 29*a* of the mounting plate 29, and disposed to be rotatable around the through hole 29*a*.

In addition, the closing latch locking device 80 may be disposed in a cylindrical shape in which the protruding portion and the body portion 81 have different diameters, and the protruding portion may have a smaller diameter than the through hole 29*a* and the body portion 81 may have a larger diameter than the through hole 29*a*, thereby allowing only the protruding portion to be disposed to protrude from the rear of the mounting plate 29 through the through hole 29*a*.

Meanwhile, the protruding portion may have a shape in which a portion thereof is cut along the diameter. Accordingly, the protruding portion may have an uncut first end portion 80*a* and a cut second end portion 80*b*, and thus the first end portion 80*a* and the second end portion 80*b* may have semicircular pillar shapes with different heights protruding from the mounting plate 29. That is, the first end portion 80*a* protrudes higher from the mounting plate 29 than the second end 80*b*, while the second end 80*b* protruding from the mounting plate 29 may be disposed below a predetermined height or at the same height as the mounting plate 29.

Meanwhile, the body portion 81 of the closing latch locking device 80 may be disposed to come into contact with the closing latch 34 so as to prevent the rotation of the closing latch 34. That is, when a rotational force (an elastic force of the spring) that can rotate the closing latch 34 in one direction about the closing latch rotation shaft is generated, the body portion 81 may be disposed to restrain the body of the closing latch 34 through its contact so as to prevent the rotation of the closing latch 34.

Here, a groove 81*a* may be disposed on one side of the body portion 81. That is, the body portion 81 may have one side on which the groove 81*a* is disposed and the other side on which the groove 81*a* is not disposed. Further, it may be disposed integrally with the protruding portion so that when the protruding portion rotates, the body portion 81 rotates together.

Meanwhile, when the body portion 81 rotates so that the body of the closing latch 34 in contact with the body portion 81 reaches one side where the groove 81*a* is disposed, the body of the closing latch 34 may be rotated by a space where the groove 81*a* is disposed to release a restrained state of the closing latch 34.

Therefore, the closing latch 34 may rotate around the closing latch rotation shaft (an operation of the closing latch 34), and by means of the operation of the closing latch 34, the spring energy of the circuit breaker due to the trip latch 35 that has been open may be released.

Meanwhile, the groove 81*a* of the body portion 81 may be disposed in a state where a portion of the body portion 81 is cut along a diameter of the body portion 81. Accordingly, at least part of the body portion 81 may have a semicircular pillar shape, as shown in FIG. 19.

Meanwhile, according to the present disclosure, the interlock plate 40 (hereinafter referred to as an interlock member 40) and the protruding portion 80*a* of the closing latch locking device may be connected by at least one link member to convert a vertical linear motion of the interlock member 40 into a rotational movement. Therefore, the protruding portion 80*a* of the closing latch locking device may be rotated according to the vertical linear movement of the interlock member 40.

Figure 20:
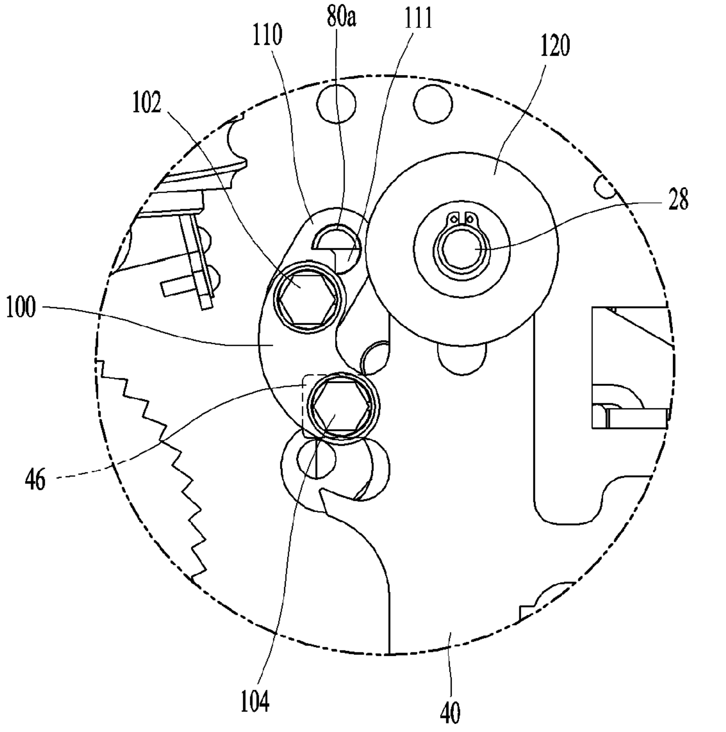
FIGS. 20 to 22 are operational state diagrams showing examples of an operation of an interlock member and a closing latch locking device connected through a link member according to the present disclosure.
Figure 21:
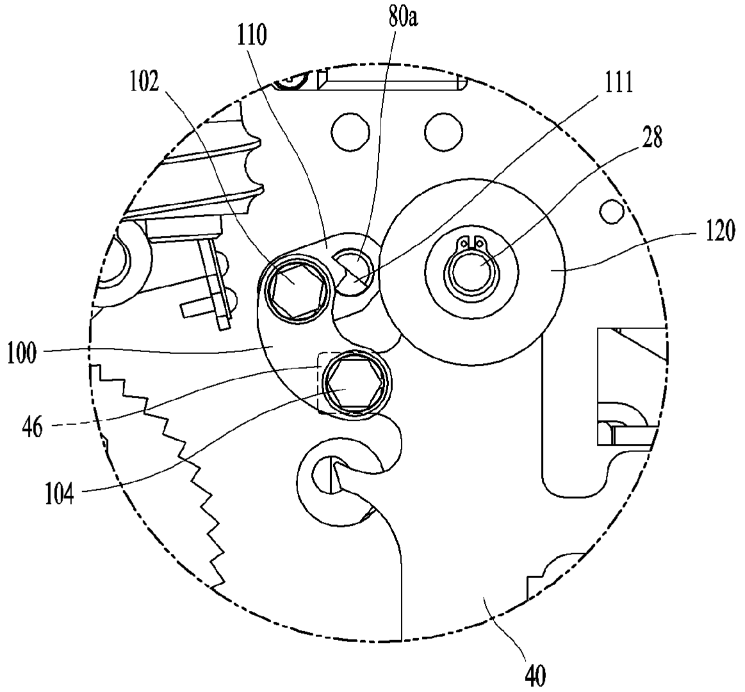
Figure 22:
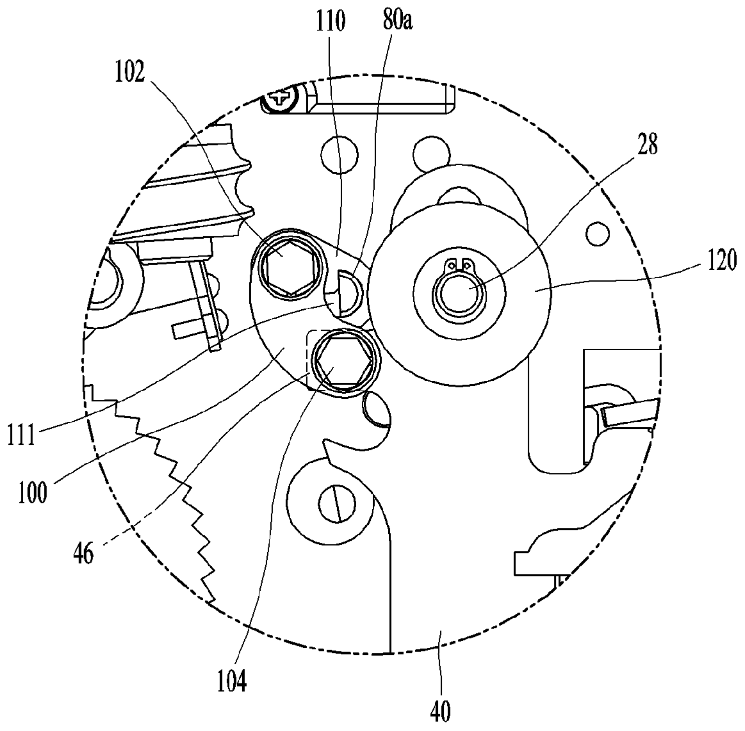

FIGS. 20 to 22 are exemplary diagrams showing operational states of the interlock member 40 and the closing latch locking device 80 connected through the link member according to the present disclosure.

FIGS. 20 to 22 show enlarged views of a link member, the connection portion 46 of the interlock member 40 and the protruding portion 80*a* of the closing latch locking device 80 connected through the link member at the rear of the circuit breaker according to an embodiment of the present disclosure.

First, referring to FIG. 20, FIG. 20 shows an example of a state in which the interlock member 40 is placed in the inspection position 71, the ready position 73, or the operation position 75 according to an embodiment of the present disclosure.

In this case, it is shown that the interlock member 40 is in a state in which an upward movement is not performed, that is, a case where the interlock member 40 is at a lowered position. In this case, the first lever 41 and the second lever 42 may be in a state in which the closing latch 34 and the trip latch 35 are not operated.

Referring to FIG. 20, the connection portion 46 of the interlock member 40 of the circuit breaker according to an embodiment of the present disclosure may be coupled to the first coupler 104 through a coupling groove. Furthermore, the first coupler 104 may be coupled to the connection link 100. Therefore, the connection portion 46 may be connected to the connection link 100 through the first coupler 104.

Here, the first coupler 104 may include a rotation member, and the connecting link 100 may be connected to the connection portion 46 through the rotation member. In this case, the connection link 100 may be connected to the connection portion 46 of the interlock member 40 so as to be rotatable about the first coupler 104 as an axis.

Meanwhile, the connection link 100 may be connected to the operation link 110 through a second coupler 102. In this case, the second coupler 102 may include a rotation member, and the operation link 110 may be connected to the connecting link 100 through the rotation member of the second coupler 102. Accordingly, the operation link 110 may be connected to the connection link 100 so as to be rotatable about the second coupler 102 as an axis.

Meanwhile, the operation link 110 may include one side disposed with a groove that can be connected to the second coupler 102, and the other side disposed with a connection groove 111 that can be connected to the protruding portion 80*a* of the closing latch locking device 80. Here, the connection groove 111 of the operation link 110 may be disposed according to the shape of the protruding portion 80*a* so as to fix the protruding portion 80*a* when the protruding portion 80*a* is inserted thereinto.

For an example, when the protruding portion 80*a* is disposed in a semicircular cross-sectional shape (e.g., a cross-section of the first end portion 80*a*) as shown above in FIG. 19, the connection groove 111 may have a semicircular shape or a fan shape formed by an arc with a central angle greater than 180 degrees to allow the semicircular-shaped protruding portion 80*a* to be inserted thereinto. Examples of different operation links 110 having these various types of connection grooves 111 will be described in more detail with reference to FIG. 23 below.

FIG. 21 shows an example of a case where the interlock member 40 according to an embodiment of the present disclosure rises to a first height as the interlock rod 50 moving on the interlock operation rail 70 moves along the second convex portion 74.

Here, the second convex portion 74 may be disposed at a height next to the first convex portion 72 so as to have a height higher than those of the inspection position 71, the ready position 73, and the operation position 75, but a height lower than that of the first convex portion 72. In this case, the contact end portion 51 of the interlock member 40 may rise to allow the second lever 42 to operate the trip latch 35, but not to allow the first lever 41 to operate the closing latch 34.

In this case, referring to FIG. 21, the connection portion 46 may rise due to the rise of the interlock member 40, and the first coupler 104 may move upward as the connection portion 46 rises.

Furthermore, when the first coupler 104 moves upward, a distance between the first coupler 104 and the protruding portion 80*a* of the closing latch locking device 80 may be reduced. Here, the protruding portion 80*a* and the connection portion 46 of the interlock member 40 are connected through the connection link 100 and the operation link 110. Therefore, as the first coupler 104 moves upward, the connecting link 100 and the operation link 110 may be folded around the second coupler 102 in an outward direction of the interlock member 40, thereby reducing a distance between the connection portion 46 (i.e., the first coupler 104) and the protruding portion 80*a*.

Therefore, as shown in FIG. 21, the second coupler 102 may move in an upward diagonal direction toward the outside of the interlock member 40 as the first coupler 104 moves upward, the operation link 110 connected to the second coupler 102 may be rotated clockwise while the connection link 100 and the operation link 110 are folded by the movement of the second coupler 102 in the upward diagonal direction. Furthermore, by the rotation of the operation link 110, the protruding portion 80*a* of the closing latch locking device 80 engaged with the connection groove 111 of the operation link 110 may be rotated at a predetermined angle.

Meanwhile, the protrusion portion 28 of the circuit breaker body coupled to a sliding hole disposed at a top of the interlock member 40 may be coupled to the sliding hole through a wide washer 120. The wide washer 120 may have a sufficiently wide outer diameter, thereby preventing the second coupler 102 from moving in an inward direction of the interlock member 40 when the interlock member 40 moves in an upward direction. That is, the second coupler 102 may be guided by the wide washer 120 to move in an upward diagonal direction to the outside of the interlock member 40 when the interlock member 40 rises.

However, a rotation angle of the protruding portion 80*a* of the closing latch locking device 80 may be limited depending on a height at which the interlock rod 50 rises. As described above, the second convex portion 74 has a lower height than the first convex portion 72, and a height at which the interlock member 40 rises may be limited, and accordingly, a rotation angle of the protruding portion 80*a* of the closing latch locking device 80 may also be limited.

Furthermore, an angle at which the protruding portion 80*a* of the closing latch locking device 80 is rotated may be an angle smaller than a rotation angle at which the body of the closing latch 34 can reach one side where the groove 81*a* of the body portion 81 of the closing latch locking device 80 is disposed. Therefore, even when the protruding portion 80*a* of the closing latch locking device 80 is rotated as the interlock rod 50 rises, a state in which the body of the closing latch 34 is restrained on the other side where the groove 81*a* is not disposed in the body portion 81 of the closing latch locking device 80. Accordingly, the closing latch locking device 80 may be maintained in a state in which the closing latch 34 is restrained.

Meanwhile, FIG. 22 shows an example of a case where the interlock member 40 according to an embodiment of the present disclosure rises to a second height as the interlock rod 50 moving on the interlock operation rail 70 moves along the first convex portion 72. Here, since the first convex portion 72 has the highest height in the height adjustment block portion 79, when the interlock rod 50 moves along the first convex portion 72, the interlock member 40 may rise to the maximum height, and in this case, the contact end portion 51 of the interlock member 40 may rise to the maximum to allow the first lever 41 to operate the closing latch 34.

In this case, referring to FIG. 22, the interlock member 40 may rise higher than that shown in FIG. 21, and thus the connection portion 46 may rise higher. Therefore, a distance between the first coupler 104 and the protruding portion 80*a* of the closing latch locking device 80 may be further reduced.

Therefore, as shown in FIG. 22, the second coupler 102 may move further in an outward direction of the interlock member 40 in an upward diagonal direction. Accordingly, a folded angle between the connection link 100 and the operation link 110, that is, an angle between the connection link 100 and the operation link 100 in a folded state, may be reduced, and accordingly, the operation link 110 connected to the second coupler 102 may be rotated more clockwise. Furthermore, by the rotation of the operation link 110, the protruding portion 80*a* of the closing latch locking device 80 engaged with the connection groove 111 of the operation link 110 may be rotated at a larger angle.

Accordingly, an angle at which the protruding portion 80*a* of the closing latch locking device 80 is rotated may be an angle at which the body portion 81 is sufficiently rotated to reach the body of the closing latch 34 on one side where the groove 81*a* of the body portion 81 of the closing latch locking device 80 is disposed. Therefore, as the interlock rod 50 rises, the protruding portion 80*a* of the closing latch locking device 80 may be sufficiently rotated, and accordingly, the body portion 81 of the closing latch locking device 80 may be rotated to reach the body of the closing latch 34 on one side where the groove 81*a* is disposed.

Then, a space for the closing latch 34 to rotate may be provided by the groove 81*a* of the body portion 81. Therefore, the restraint of the body of the closing latch 34 may be released, and the closing latch 34 may be rotated. Furthermore, the closing latch 34 rotates, that is, the closing latch 34 operates, thereby releasing the spring energy of the breaker by the trip latch 35 that has been open.

Figure 23:
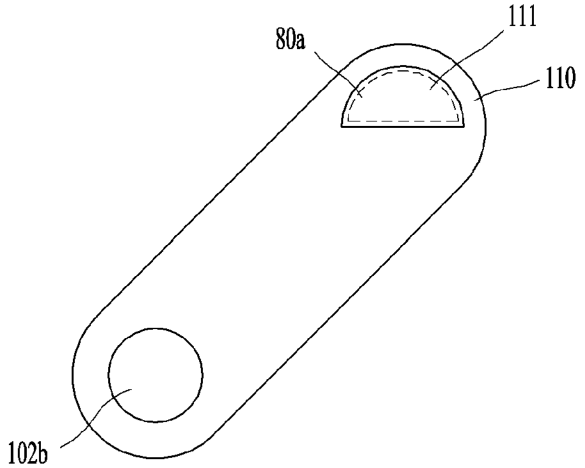
FIG. 23 is an exemplary diagram showing examples of an operation link coupled to a protruding portion of a closing latch locking device in the link member.
Figure 23:
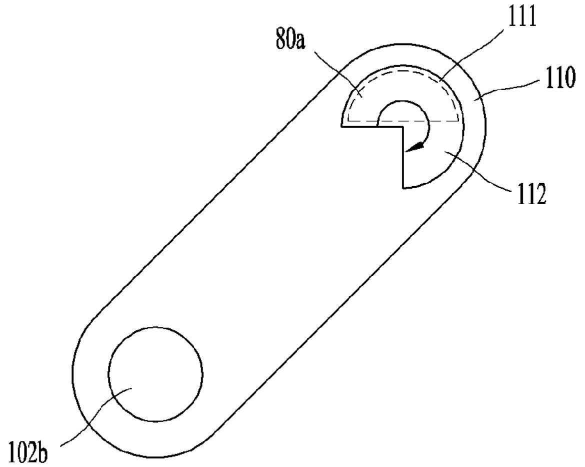
Figure 23:
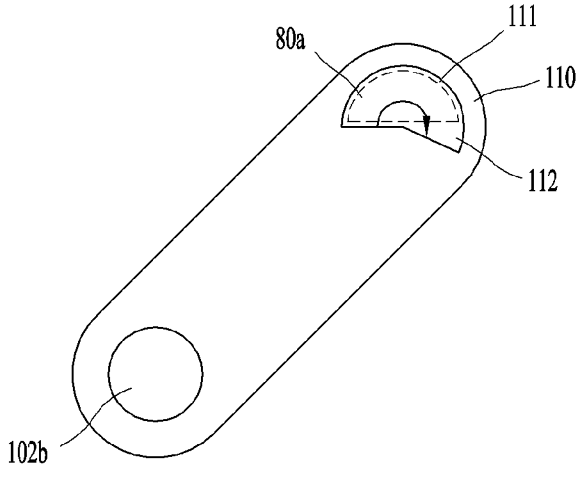

Meanwhile, FIG. 23 shows examples of the operation link 110 coupled to the protruding portion 80*a* of the closing latch locking device 80 among the link members.

First, the connection link 100 may have a coupling groove 102 disposed on one side thereof to which the second coupler 102 can be coupled. Furthermore, on the other side thereof, the connection groove 111 into which the protruding portion 80*a* can be inserted may be disposed so as to be coupled to the protruding portion 80*a* of the closing latch locking device 80.

Here, the connection groove 111 may be disposed to match a protruding shape of the protruding portion 80*a*. For example, in case where a cross-section of the protruding portion 80*a* is semicircular as shown in FIG. 19, the connection groove 111 may have a semicircular shape identical to a cross-sectional shape of the protruding portion 80*a*. In this case, a diameter of the connection groove 111 having a semicircular shape may be determined by adding a preset margin value to a diameter of the cross-section (semicircular shape) of the protruding portion 80*a* to allow the protruding portion 80*a* to be smoothly inserted thereinto.

Meanwhile, when the interlock member 40 rises excessively or at high speed, an excessive rotational force that rotates the operation link 110 may be generated. In this case, as shown in (a) of FIG. 23, when the connection groove 111 matches the cross-sectional shape of the protruding portion 80*a*, there is a possibility of damage between an appearance of the protruding portion 80*a* or the protruding portion 80*a* and the body portion 81.

Accordingly, the connection groove 111 may be disposed to absorb a rotational force of the operation link 110 as the interlock member 40 rises. In this case, the connection groove 111 may be disposed to further include a margin area according to a direction in which the protruding portion 80*a* is rotated in order to absorb the rotational force of the operation link 110. For an example, when the protruding portion 80*a* has a semicircular cross-section, the connection groove 111 may have a fan-shaped shape disposed by an arc with a central angle greater than 180 degrees.

(b) and (c) of FIG. 23 show examples in which the connection groove 111 further includes a margin area according to a direction in which the protruding portion 80*a* is rotated.

First, (b) of FIG. 23 shows an example in which the connection groove 111 is disposed in a fan-shaped shape formed by an arc with a central angle of 270 degrees. In this case, the connection groove 111 may have a rotation margin corresponding to a rotation radius of 90 degrees, and in the case of the connection groove 111, even when a rotational force capable of rotating the semicircular protrusion 80*a* by 90 degrees more than a predetermined rotation angle is applied, damage to the protrusion 80*a* may be prevented by absorbing the rotational force.

Meanwhile, (c) of FIG. 23 shows an example in which the connection groove 111 is disposed in a fan-shaped shape formed by an arc with a central angle of 200 degrees. In this case, the connection groove 111 may have a rotation margin corresponding to a rotation radius of 20 degrees, and in the case of the connection groove 111, when a rotational force capable of rotating the semicircular protrusion 80*a* by 20 degrees more than a predetermined rotation angle is applied, damage to the protrusion 80*a* may be prevented by absorbing the rotational force.

Therefore, depending on the rotation margin of the shape of each connection groove 111, the protruding portion 80*a* of the closing latch locking device 80 may be protected from an excessive rotational force of the operation link 110 generated by an excessive or high-speed rise of the interlock member 40.

Figure 24:
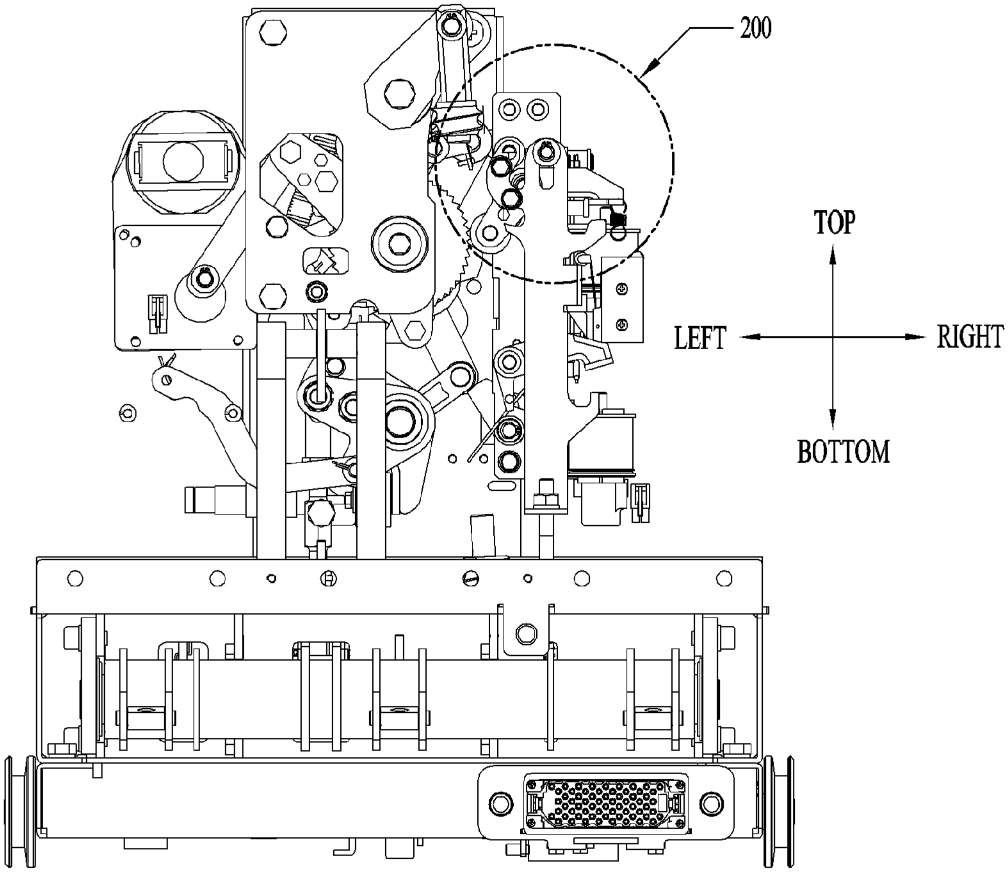
FIG. 24 is a diagram showing an example of a state in which a mounting plate is removed from a circuit breaker according to the present disclosure.
Figure 25:
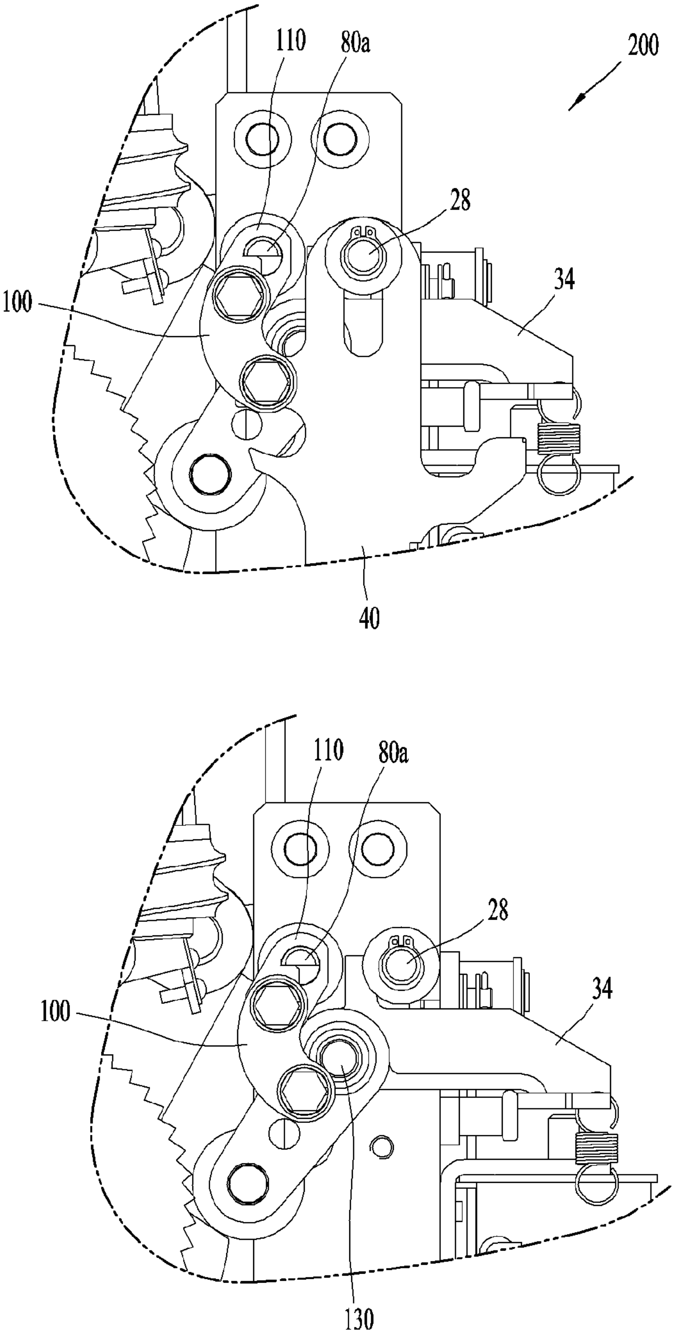
FIG. 25 is an enlarged view of a closing latch locking device and a closing latch connected to an interlock member through the link member in FIG. 24.

FIG. 24 is a diagram showing an example of a state in which the mounting plate is removed from the circuit breaker according to the present disclosure, and FIG. 25 is an enlarged view of the closing latch locking device 80 and the closing latch 34 connected to the interlock member 40 through the link member in FIG. 24.

(a) of FIG. 25 is a diagram showing an example in which the interlock member 40 is disposed, and (b) of FIG. 25 is a diagram showing the closing latch locking device 80 and the closing latch 34 excluding the interlock member 40 to exhibit a portion hidden by the interlock member 40 for the sake of convenience of description. Furthermore, referring to (b) of FIG. 25, it can be seen that the closing latch 34 is disposed to be rotatable by a closing latch rotation shaft 130.

Figure 26:
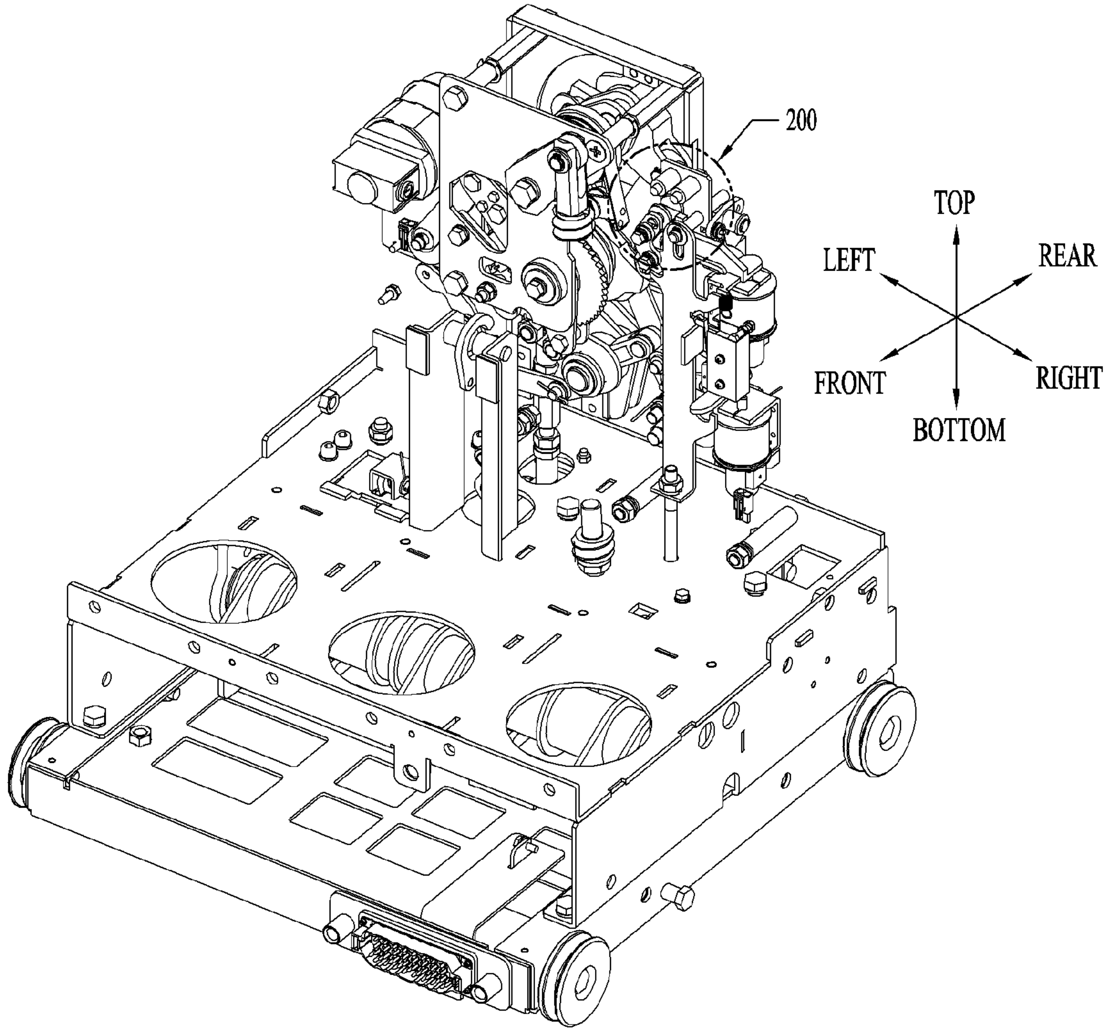
FIG. 26 is a perspective view showing a closing latch locking device and a closing latch connected to an interlock member through a link member according to the present disclosure.
Figure 27:
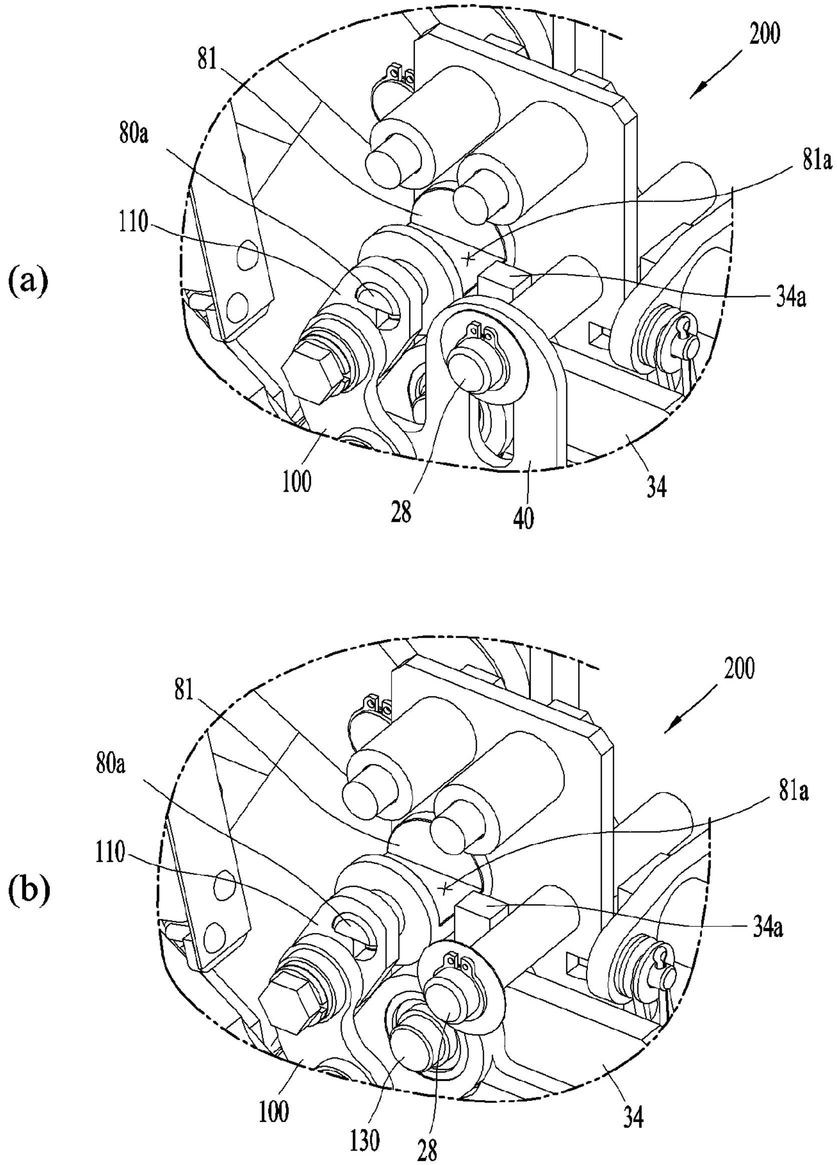
FIGS. 27 to 29 are partial perspective views showing operational states of a closing latch locking device and a closing latch connected to an interlock member through a link member according to an embodiment of the present disclosure.
Figure 28:
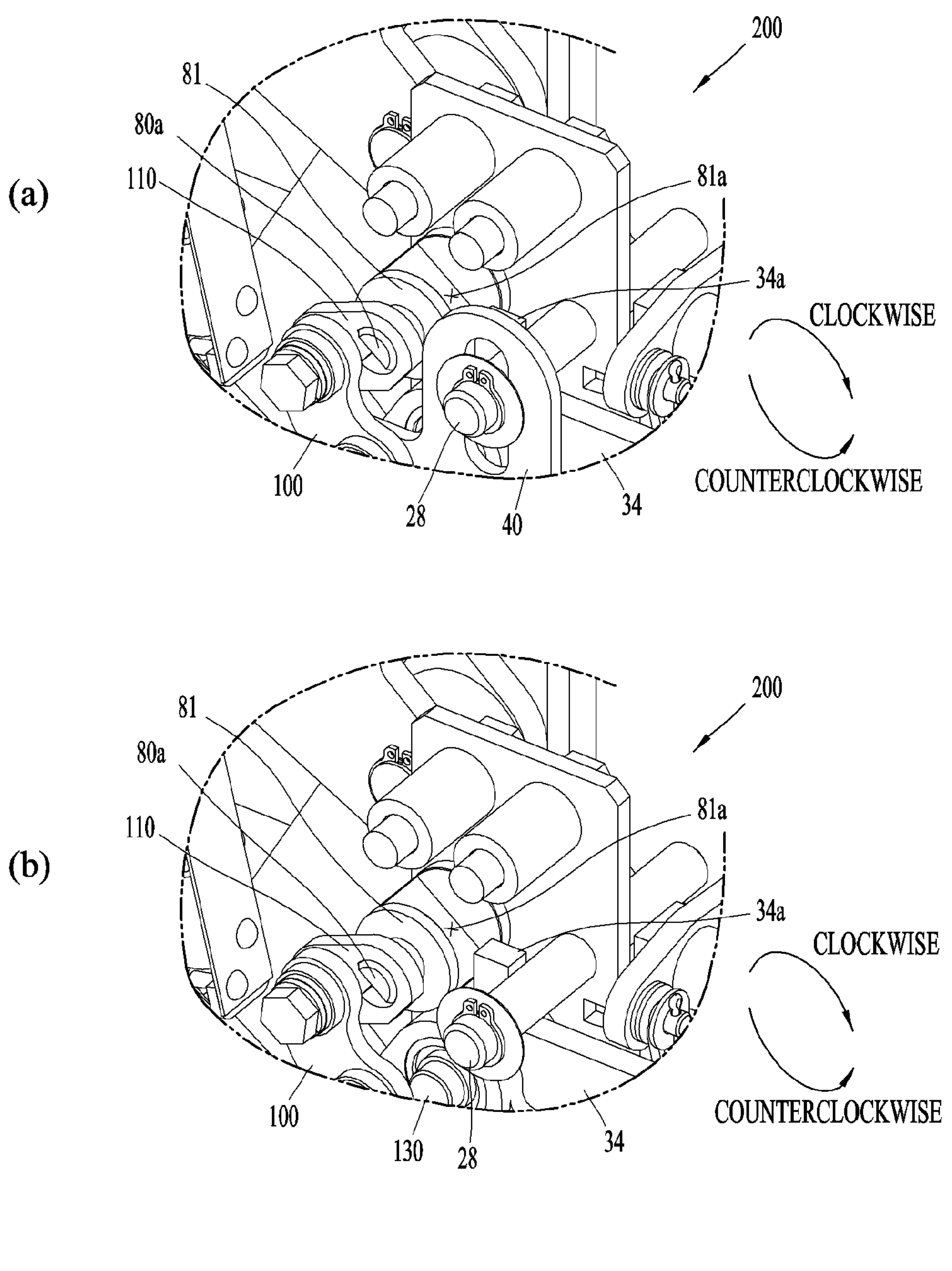
Figure 29:
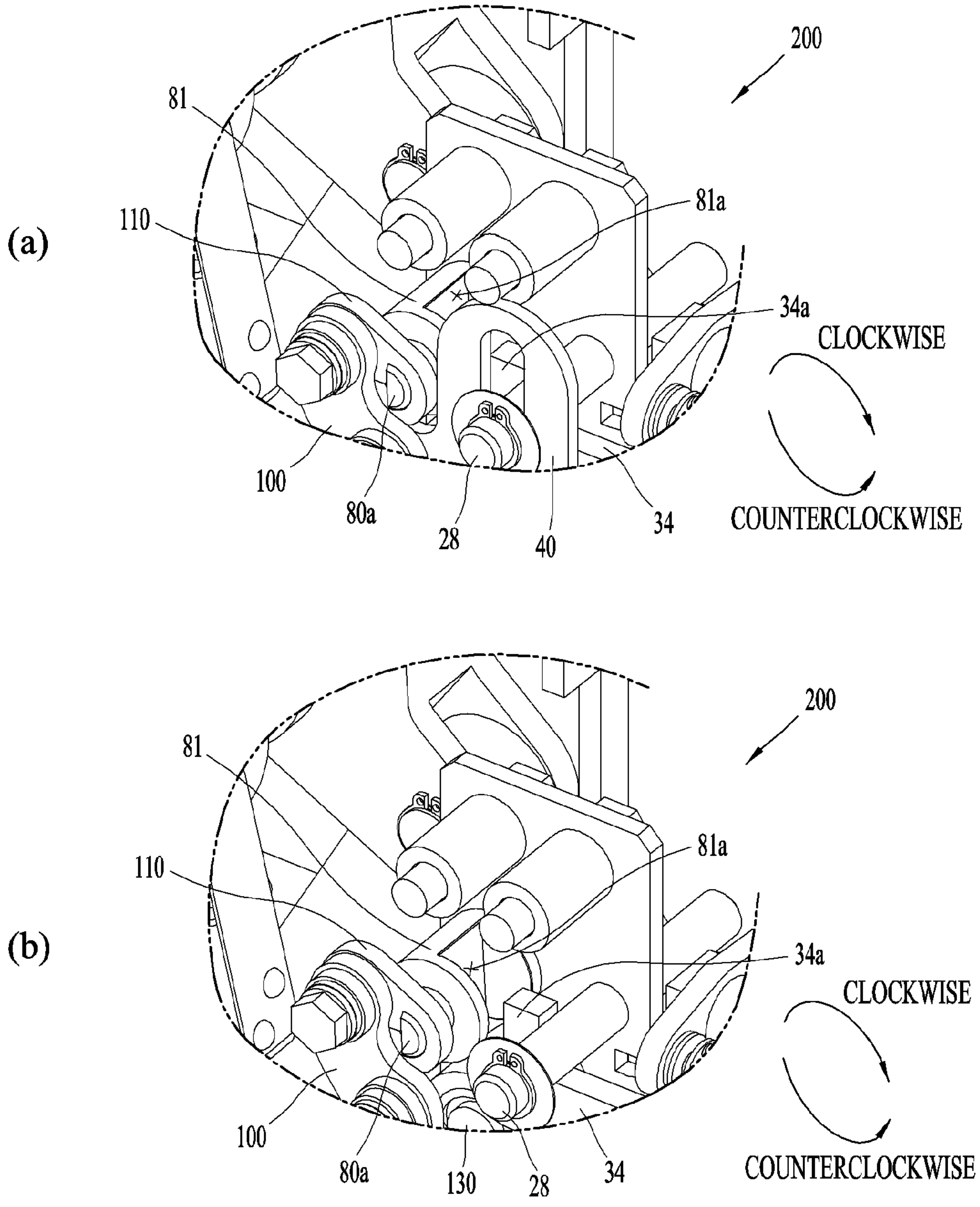

Meanwhile, FIG. 26 is a perspective view showing the closing latch locking device 80 and the closing latch 34 connected to the interlock member 40 through a link member according to the present disclosure. FIGS. 27 to 29 are partial perspective views in which a portion 200 of the closing latch locking device 80 and the closing latch 34 connected to the interlock member 40 through a link member according to the present disclosure is enlarged from a perspective view of an entire circuit breaker body shown in FIG. 26.

Referring to FIG. 27, FIG. 27 shows an example of a state in which the interlock member 40 is placed in the inspection position 71, the ready position 73, or the operation position 75 according to an embodiment of the present disclosure. Therefore, it may be a case where the interlock member 40 is in a state in which an upward movement is not performed, and the interlock member 40 is at a lowered position. In this case, the first lever 41 and the second lever 42 may be in a state in which the closing latch 34 and the trip latch 35 are not operated. Here, (a) of FIG. 27 is a diagram showing the interlock member 40, and (b) of FIG. 27 is a diagram without the interlock member 40 for the sake of convenience.

Meanwhile, when the interlock member 40 is not raised, the closing latch locking device 80 may be in a state of not being rotated by the connection link 100 and the operation link 110. Therefore, as shown in (a) and (b) of FIG. 27, the protrusion portion 34*a* of the body of the closing latch 34 may come into contact with the body portion 81 of the closing latch locking device 80 on which the groove 81*a* is not disposed, and its rotation (counterclockwise rotation) may be prevented by the body portion 81 of the closing latch locking device 80. Accordingly, the closing latch 34 may be restrained by the body portion 81 of the closing latch locking device 80.

Meanwhile, FIG. 28 shows an example in which the interlock member 40 rises to a first height as the interlock rod 50 moves along the second convex portion 74.

In this case, the height of the interlock member, which is higher than that of the inspection position 71, the ready position 73, and the operation position 75, and is lower than that of the first convex portion 72, may be a height at which the second lever 42 is able to operate the trip latch 35, but the first lever 41 is unable to operate the closing latch 34. Here, (a) of FIG. 28 is a diagram showing the interlock member 40, and (b) of FIG. 28 is a diagram without the interlock member 40 for the sake of convenience.

Referring to (a) and (b) of FIG. 28, it is shown that the first coupler 104 rises due to the rise of the interlock member 40, and the second coupler 102 moves in an upward diagonal direction through the connection link 100 to rotate the operation link 110.

In this case, as shown in FIGS. 28 (*a*) and (*b*), as the operation link 110 rotates clockwise, the protruding portion 80*a* of the closing latch locking device 80 may be rotated by a predetermined angle. Furthermore, as the protruding portion 80*a* rotates, the body portion 81 of the closing latch locking device 80 in which the groove 81*a* is disposed may be rotated together.

However, a rotation angle of the protruding portion 80*a* may be limited depending on a height at which the interlock rod 50 rises. In this case, the second convex portion 74 has a lower height than the first convex portion 72, and a height at which the interlock member 40 rises may be limited, and accordingly, a rotation angle of the protruding portion 80*a* of the closing latch locking device 80 may also be limited.

Therefore, as shown in (b) of FIG. 28, even when the body portion 81 of the closing latch locking device 80 is rotated, the protruding portion 34*a* of the body of the closing latch 34 may still be maintained in contact with the other side of the body portion 81 of the closing latch locking device 80 on which the groove 81*a* is not disposed. Accordingly, the closing latch 34 may be maintained in a state of being restrained by the body portion 81 of the closing latch locking device 80.

Meanwhile, FIG. 29 shows an example in which the interlock member 40 rises to a second height higher than the first height as the interlock rod 50 moves along the first convex portion 72. Here, the first convex portion 72 is placed at the highest height in the height adjustment block portion 79, and the interlock member 40 rises to the maximum height. Accordingly, the contact end portion 51 of the interlock member 40 rises to the maximum to allow the first lever 41 to operate the closing latch 34. Here, (a) of FIG. 29 is a diagram showing the interlock member 40, and (b) of FIG. 29 is a diagram without the interlock member 40 for the sake of convenience.

Referring to (a) and (b) of FIG. 29, as the interlock member 40 rises to a second height, the second coupler 102 may move further in an upper diagonal direction. Then, the connection link 100 and the operation link 110 may be folded more severely than shown in (a) and (b) of FIG. 28. That is, a folding angle between the connection link 100 and the operation link 110 may become smaller.

Accordingly, the operation link 110 may be rotated greater than that shown in (a) and (b) of FIG. 28. Therefore, as shown in (a) and (b) of FIG. 29, the body portion 81 of the closing latch locking device 80 in which the groove 81*a* is disposed may be rotated (clockwise rotation) at a larger angle.

In this case, an angle at which the body portion 81 of the closing latch locking device 80 is rotated may be an angle at which the body portion 81 of the closing latch locking device 80 is sufficiently rotated to reach the protrusion portion 34*a* of the closing latch 34 on one side where the groove 81*a* is disposed in the body portion 81 of the closing latch locking device 80.

Therefore, as shown in (b) of FIG. 29, when the body portion 81 of the closing latch locking device 80 is rotated, the protrusion portion 34*a* of the body of the closing latch 34 may reach one side where the groove 81*a* is disposed in the body portion 81 of the closing latch locking device 80. Therefore, a space into which the protrusion portion 34*a* of the closing latch 34 can enter may be provided in the body portion 81 of the closing latch locking device 80 by means of the groove 81*a*, thereby allowing the rotation of the closing latch 34. Then, the closing latch 34 rotates, that is, the closing latch 34 operates, and the spring energy of the breaker may be released by the trip latch 35 that has been open.

The embodiments described above are embodiments implementing the present disclosure, and it will be apparent to those skilled in this art that various changes and modifications may be made thereto without departing from the gist of the present disclosure. Accordingly, it should be noted that the embodiments disclosed in the present disclosure are only illustrative and not limitative to the concept of the present disclosure, and the scope of the concept of the invention is not limited by those embodiments. In other words, the scope protected by the present disclosure should be construed by the accompanying claims, and all the technical concept within the equivalent scope of the invention should be construed to be included in the scope of the right of the present disclosure.

REFERENCE SIGNS LIST

20: Breaker chamber 21: Terminal bushing
25: Breaker body 26: Breaking unit
27: Bottom plate 28: Protrusion portion
29: Mounting plate 30: Cradle
31: Mechanical mechanism 32: On button
33: Off button 34: Closing latch
35: Trip latch 36: Charging shaft
37: Drive lever 38: Crank shaft
39: Operation lever 40: Interlock plate
41: First lever 42: Second lever
43: Sliding hole 46: Connection portion
50: Interlock rod 51: Contact end portion
53: Fixed portion 55: Return spring
60: Rail groove 70: Interlock operation rail
71: Inspection position 72: First convex portion
73: Ready position 74: Second convex portion
75: Operation position 79: Height adjustment block portion
80: Closing latch locking device 80*a*: Closing latch locking device protruding portion
81: Closing latch locking device body portion 81*a*: Closing latch locking body portion groove
100: Connection link 102: Second coupler
104: First coupler 110: Operation link
111: Connection groove 120: Wide washer

The invention claimed is:

1. A circuit breaker comprising a breaker body having a closing latch for a closing operation and a trip latch for a trip operation, and a cradle that carries the breaker body to perform an insertion and withdrawal operation within a breaker chamber, the circuit breaker comprising:

a closing latch locking device disposed to be rotatable so as to restrain or release the closing latch according to a rotation angle;

an interlock operation rail provided on the cradle and set to an inspection position, a ready position, and an operation position;

an interlock member that operates at least one of the closing latch and the trip latch in a section other than the inspection position, the ready position, and the operation position while moving vertically in conjunction with a relative movement of the interlock operation rail; and at least one link member disposed to connect between the interlock member and the closing latch locking device, and convert a vertical linear movement of the interlock member into a rotational movement so as to rotate the closing latch locking device.

2. The circuit breaker of claim 1, wherein the closing latch is disposed to rotate a closing latch body around a closing latch rotation shaft during operation, and wherein the closing latch locking device is disposed to be rotatable, and provided with a body portion disposed to restrain a protrusion portion of the closing latch body so as to prevent the rotation of the closing latch body.

3. The circuit breaker of claim 2, wherein the body portion of the closing latch locking device is provided with a groove disposed to be larger than a size of the protrusion portion on one side thereof, and disposed to rotate according to the rotation of the closing latch locking device so as to release, when the protrusion portion reaches one side of the body portion on which the groove is disposed, the restraint of the protrusion portion of the closing latch body by a space where the groove is disposed.

4. The circuit breaker of claim 2, wherein the closing latch locking device is disposed integrally with the body portion, the closing latch locking device comprising a protruding portion protruding from a rear side of a mounting plate of the circuit breaker body on which the interlock member is disposed.

5. The circuit breaker of claim 4, wherein the at least one link member comprises:

an operation link coupled to the protruding portion through a connection groove disposed into which the protruding portion is inserted, the operation link having a predetermined length; and a connection link connecting between the operation link and the interlock member, the connection link having a predetermined length, wherein a first coupler and a second coupler, each comprising a rotation member, are connected between the interlock member and the connection link and between the connection link and the operation link therethrough and disposed to be rotatable.

6. The circuit breaker of claim 5, wherein at least one link member is disposed, when the interlock member moves upward, to move the second coupler in an upward diagonal direction to an outside of the interlock member by the movement of the connection link according to the movement of the interlock member, and rotate the protruding portion while the connection link and the operation link are folded as the second coupler moves.

7. The circuit breaker of claim 6, wherein the interlock member comprises a wide washer that guides the movement of the second coupler such that the connection link and the operation link are folded in an outward direction of the interlock member when the interlock member moves upward.

8. The circuit breaker of claim 7, wherein the wide washer is disposed at a top of the interlock member, and coupled to a protruding portion of the circuit breaker body coupled to a sliding hole that guides a vertical movement of the interlock member.

9. The circuit breaker of claim 5, wherein the connection groove further comprises a margin area along a direction in which the protruding portion is rotated, so as to absorb a rotational force due to the rise of the interlock member.

10. The circuit breaker of claim 9, wherein the protruding portion protrudes from the mounting plate in a semicircular pillar shape, and the connection groove has a fan-shaped shape formed by an arc having a central angle greater than 180 degrees.

11. The circuit breaker of claim 2, wherein the interlock operation rail comprises at least one convex portion such that rising heights of the interlock member between the inspection position and the ready position and between the ready position and the operation position are different when the interlock member moves along the interlock operation rail, and wherein the at least one link member rotates the closing latch locking device at different angles according to the different rising heights of the interlock member.

12. The circuit breaker of claim 11, wherein the interlock member is disposed with a first lever in contact with the closing latch and a second lever in contact with the trip latch, which protrude from one side thereof, and wherein when the interlock operation rail rises to a first height according to a height between the inspection position and the ready position, the closing latch is operated by the rising first lever, and the trip latch is operated by the rising second lever.

13. The circuit breaker of claim 12, wherein the closing latch locking device rotates the closing latch locking device by a preset first angle when the interlock member rises by the first height, and wherein when the closing latch locking device body portion rotates by the first angle, a protrusion portion of the closing latch body reaches one side where the groove of the closing latch locking device body portion is disposed to release the restraint of the closing latch body protrusion portion by the groove.

14. The circuit breaker of claim 12, wherein the interlock member is disposed to operate only the trip latch by the second lever when the interlock member rises to a second height lower than the first height according to the height between the ready position and the operation position of the interlock operation rail.

15. The circuit breaker of claim 13, wherein the closing latch locking device rotates the closing latch locking device by a second angle less than the first angle when the interlock member rises by the second height, and wherein when the closing latch locking device body portion rotates by the second angle, the protrusion portion of the closing latch body is restrained on the other side that is different from one side of the closing latch locking device body portion on which the groove is disposed to prevent the rotation of the closing latch body.

16. The circuit breaker of claim 12, wherein a gap between the closing latch and the first lever is disposed to be greater than that between the trip latch and the second lever while no external force is applied.

* * * * *